(12) United States Patent
Sato et al.

(10) Patent No.: US 7,920,357 B2
(45) Date of Patent: Apr. 5, 2011

(54) MAGNETIC RECORDING METHOD USING FERROMAGNETIC RESONANCE AND THIN-FILM MAGNETIC HEAD FOR USING THE METHOD

(75) Inventors: Isamu Sato, Tokyo (JP); Tetsuya Roppongi, Tokyo (JP); Yuichi Watabe, Tokyo (JP); Norikazu Ota, Tokyo (JP); Hiroshi Ikeda, Tokyo (JP); Mikio Matsuzaki, Tokyo (JP)

(73) Assignee: TDK Corporation, Tokyo (JP)

( * ) Notice: Subject to any disclaimer, the term of this patent is extended or adjusted under 35 U.S.C. 154(b) by 829 days.

(21) Appl. No.: 11/907,095

(22) Filed: Oct. 9, 2007

(65) Prior Publication Data

US 2008/0151436 A1    Jun. 26, 2008

(30) Foreign Application Priority Data

Dec. 21, 2006    (JP) ................................. 2006-344016

(51) Int. Cl.
*G11B 5/17* (2006.01)

(52) U.S. Cl. ................................. 360/123.17

(58) Field of Classification Search ............. 360/123.02, 360/123.11, 123.17, 123.39, 125.02, 125.31, 360/125.74

See application file for complete search history.

(56) References Cited

U.S. PATENT DOCUMENTS

| 4,464,691 | A | * | 8/1984 | Sawazaki et al. | ............. 360/111 |
| 4,677,512 | A | * | 6/1987 | Akiyama et al. | ............... 360/110 |
| 6,356,113 | B1 | | 3/2002 | Contreras et al. | |
| 7,256,955 | B2 | * | 8/2007 | Pokhil et al. | ..................... 360/68 |
| 7,271,981 | B2 | * | 9/2007 | Ju et al. | ..................... 360/125.31 |
| 7,473,478 | B2 | * | 1/2009 | Sbiaa et al. | ................. 428/693.1 |
| 7,791,838 | B2 | * | 9/2010 | Sato et al. | ................ 360/125.02 |
| 7,817,375 | B2 | * | 10/2010 | Sato et al. | ................ 360/125.31 |

FOREIGN PATENT DOCUMENTS

| JP | A 2001-250201 | 9/2001 |
| JP | A 2004-158067 | 6/2004 |

OTHER PUBLICATIONS

Klaassen, K. B. et al., "Writing at High Data Rates," Journal of Applied Physics, vol. 93, No. 10, p. 6450-6452 (May 2003).

* cited by examiner

*Primary Examiner* — Angel A. Castro
(74) *Attorney, Agent, or Firm* — Oliff & Berridge, PLC

(57) ABSTRACT

Provided is a thin-film magnetic head capable of writing data with high accuracy on a magnetic recording medium having high coercive force without heating. The head comprises an electromagnetic coil element comprising: a main magnetic pole; an auxiliary magnetic pole; and a write coil formed so as to pass through at least between the main magnetic pole and the auxiliary magnetic pole, for generating the write magnetic field. In this head, a part of the write coil has a layered structure of: a resonance coil layer for generating a resonance magnetic field having ferromagnetic resonance frequency of a magnetic recording layer of a magnetic recording medium or having a frequency in the vicinity thereof; and a write coil layer. And further, the resonance coil layer and the write coil layer sandwich an insulating layer therebetween.

46 Claims, 15 Drawing Sheets

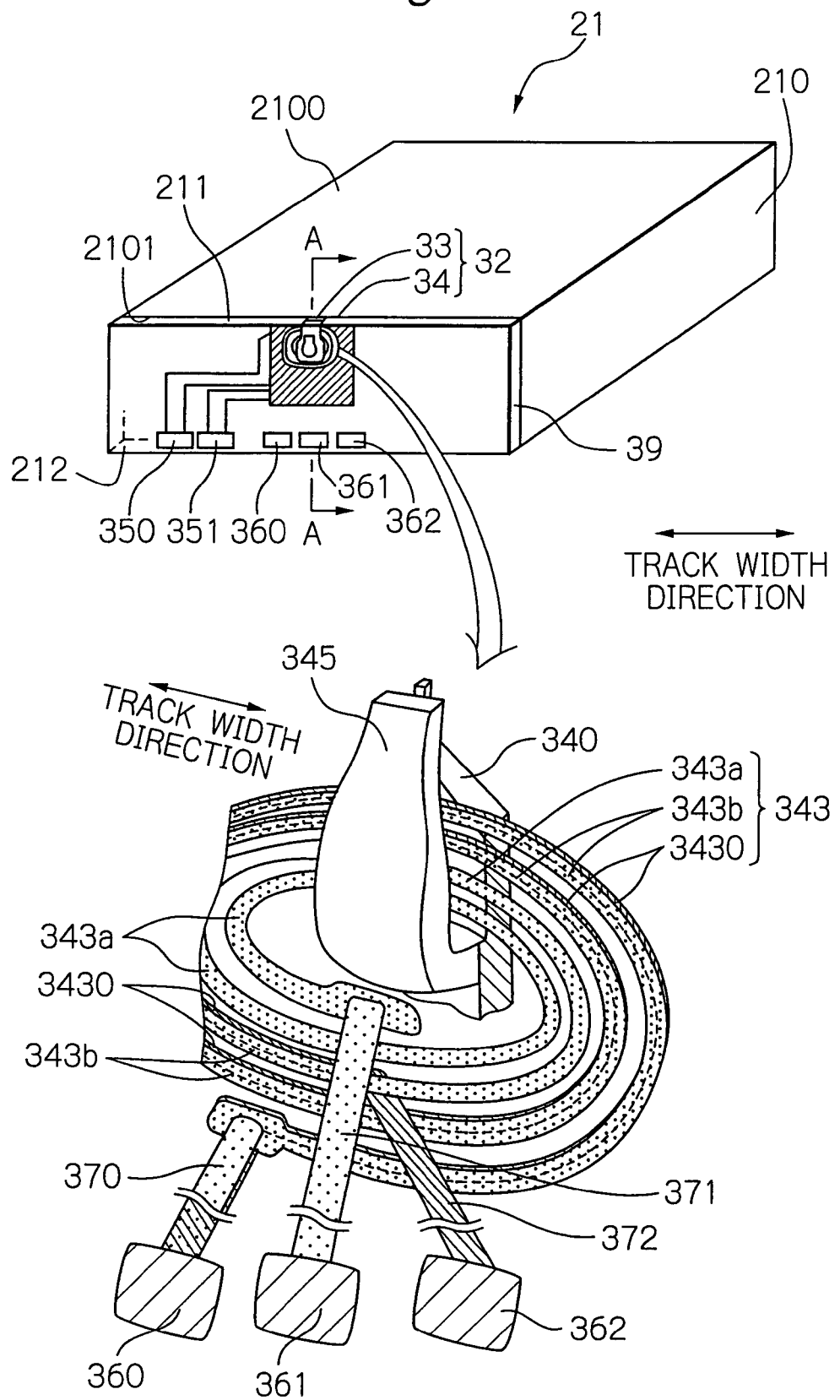

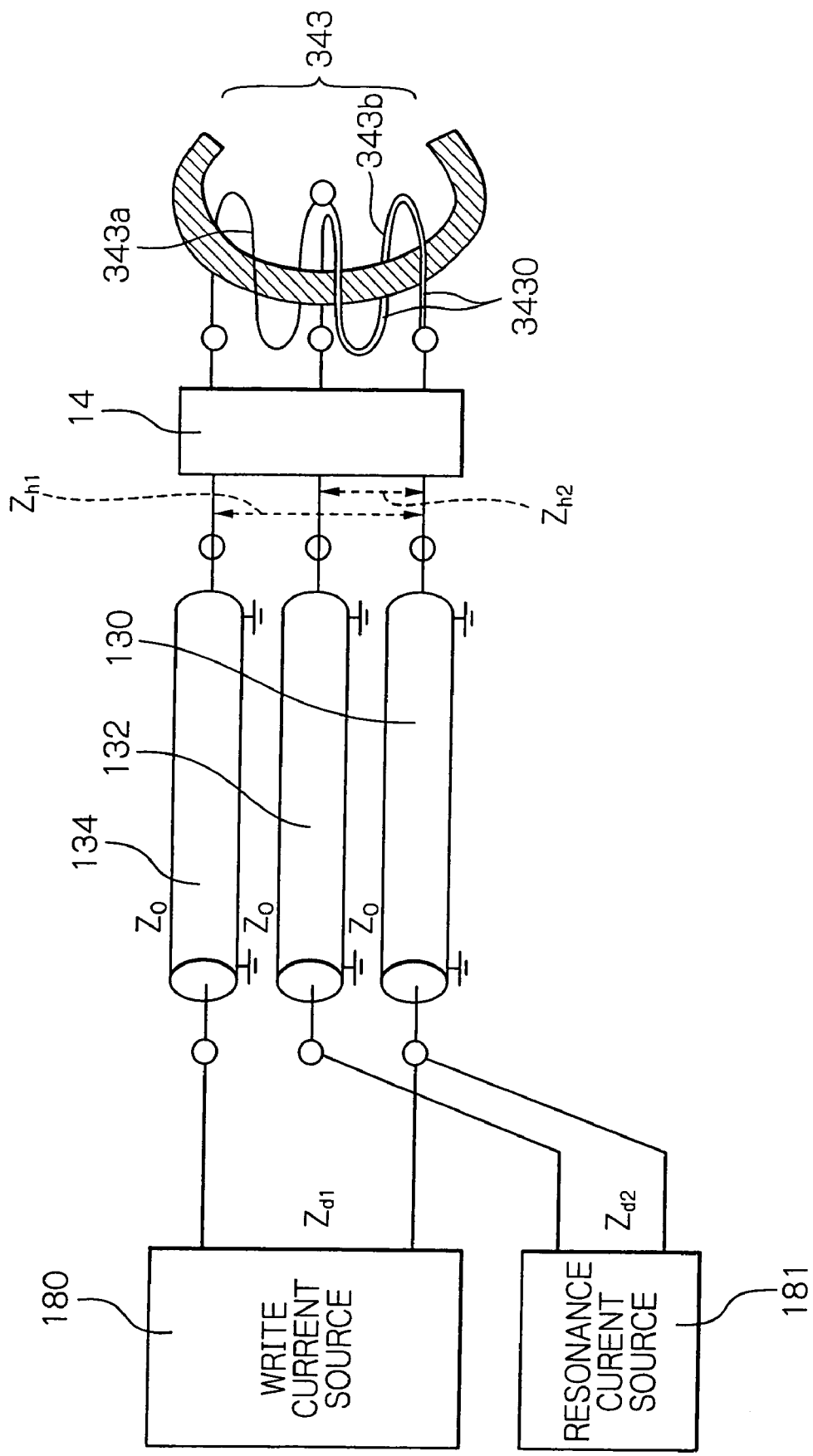

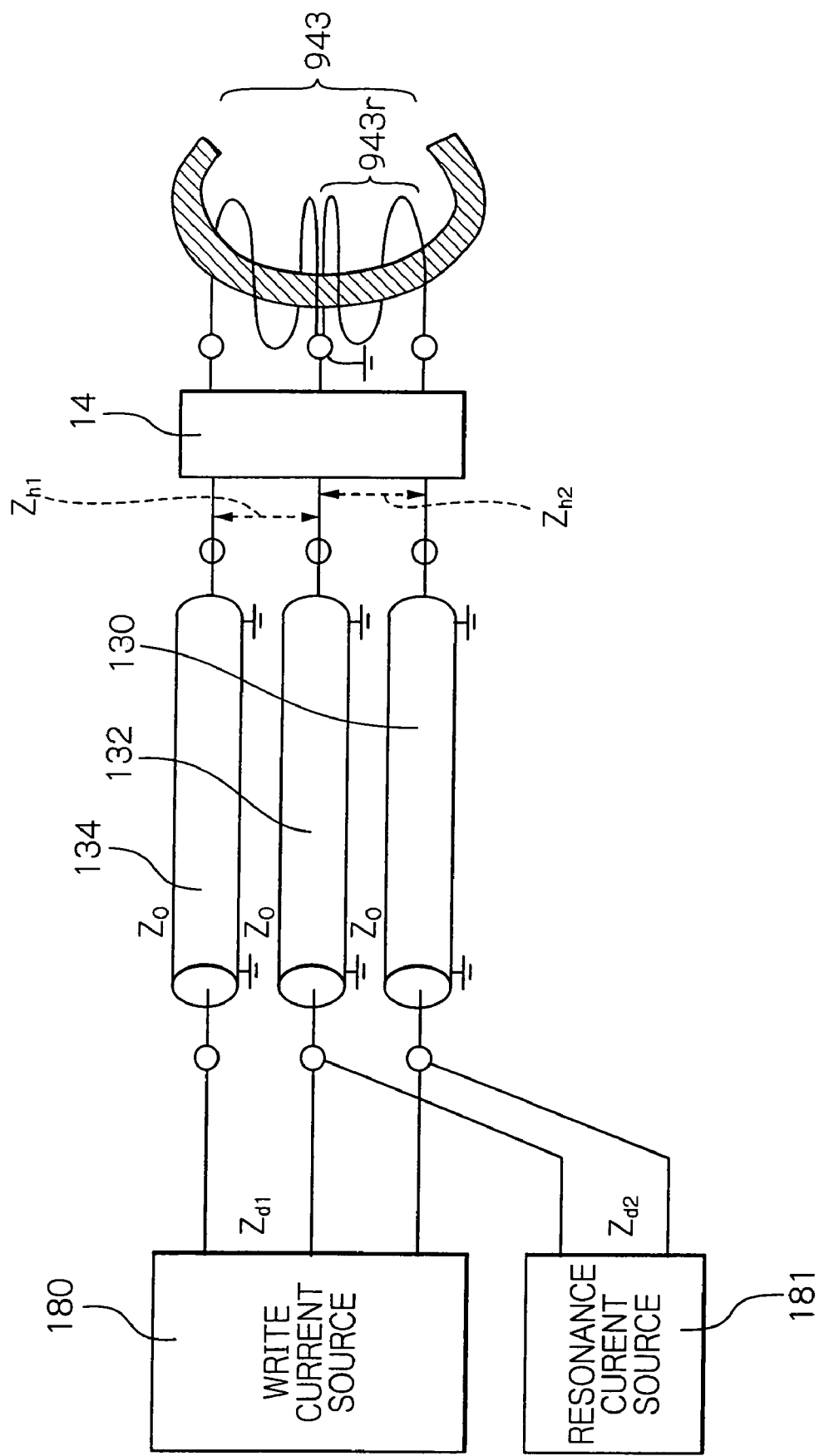

US 7,920,357 B2

MAGNETIC RECORDING METHOD USING FERROMAGNETIC RESONANCE AND THIN-FILM MAGNETIC HEAD FOR USING THE METHOD

PRIORITY CLAIM

This application claims priority from Japanese patent application No. 2006-344016, filed on Dec. 21, 2006, which is incorporated herein by reference.

BACKGROUND OF THE INVENTION

1. Field of the Invention

The present invention relates to a thin-film magnetic head for writing data on a magnetic recording medium with high coercive force to stabilize the magnetization thermally, a head gimbal assembly (HGA) having this thin-film magnetic head and a magnetic recording/reproducing apparatus having this HGA. Further, the present invention relates to a magnetic recording method for writing data on such a magnetic recording medium with high coercive force.

2. Description of the Related Art

Further improvement of the performance and characteristic of thin-film magnetic heads and magnetic recording media has been demanded with acceleration of the recording density of magnetic recording/reproducing apparatuses represented by magnetic disk drive apparatuses. As the thin-film magnetic head, used is a composite type thin-film magnetic head in which a magnetoresistive (MR) effect element as a read head element for reading data and an electromagnetic coil element as a write head element for writing data are stacked. Currently, in this head, the reduction in size of the both head elements by applying microfabrication, and the improvement of characteristics thereof by applying new material system has been intended.

On the other hand, the magnetic recording medium is composed of a magnetic particle assembly, and generally, one record bit is constituted of a plurality of the magnetic particles. In order to intensify the recording density by reducing a magnetic fluctuation in borders of the record bits, further miniaturization of the magnetic particles has been conventionally tried. However, the more the magnetic particle is miniaturized, the more a heat fluctuation is generated in the magnetic particle due to the reduction in volume of the particle, thereby degrading thermal stability of the magnetization.

As a measure to cope with this problem, currently, the transition from longitudinal magnetic recording system to perpendicular magnetic recording system has been considered and realized in actual products. In the perpendicular magnetic recording medium, the heat fluctuation can be suppressed more easily by securing a predetermined magnetic recording layer thickness despite the miniaturization of the magnetic particles, compared with a longitudinal magnetic recording medium. Consequently, the surface recording density can be improved largely.

However, to further improve the recording density, required is further miniaturization of the magnetic particles that constitute the perpendicular magnetic recording medium and the secure suppression of the heat fluctuation. Thus, increasing magnetic anisotropy energy of the magnetic particles may be considered as the measure. However, the increase in the magnetic anisotropy energy causes the increase in coercive force of the magnetic recording layer. Actually, the coercive force of the magnetic recording layer intended to suppress the heat fluctuation is more than 5 kOe (400 kA/m). On the other hand, the write field intensity of the magnetic head is determined mainly by the saturation magnetic flux density of a soft-magnetic material that constitutes poles in the head, so that a saturated magnetic recording, which requires a write field intensity of about 2 times higher than the coercive force, is difficult to be implemented.

As another measure, there has been proposed a heat-assisted magnetic recording system in which a writing is performed to a magnetic recording medium with coercive force reduced by heating just before the write field is applied, while using the magnetic recording layer with high coercive force (that is, with large magnetic anisotropy energy $K_u$).

As a method for heating the magnetic recording medium in the heat-assisted magnetic recording system, currently, an irradiation electron beam or near-field light to the magnetic recording medium has been mainly proposed. For example, according to Japanese Patent Publication No. 2001-250201A, electrons are irradiated to the magnetic recording medium using an electron discharge source. The irradiation causes the recording portion of the magnetic recording medium to be heated and rise in temperature. As a result, the coercive force is lowered and the magnetic information can be recorded by the magnetic recording head. Further, Japanese Patent Publication No. 2004-158067A discloses a technology in which a scattering body that constitutes a near-field light probe and is provided adjacent to a main magnetic pole of the perpendicular magnetic recording head is irradiated with laser beam by using a semiconductor laser device provided in the head. By using the technology, near-field light is generated, and the near-field light is irradiated to the magnetic recording medium. As a result, the magnetic recording medium is heated and rises in temperature.

However, such heat-assisted magnetic recording system contains a variety of difficulties in terms of technology, which is a problem to be solved.

To actually realize the thin-film magnetic head for heat-assisted magnetic recording described above, generally, a minute electron discharge source, a laser light source or an optical component with high positioning accuracy and dimensional accuracy is needed to be formed inside the head, which becomes a large burden for the manufacturing process. As a result, this can bring increase in the manufacturing cost. Further, the structure is complicated by providing new devices such as the electron discharge source, the laser beam source or the optical component, thereby disabling the head to be compact, which is a demand for the commercial product.

In the structure of the general thin-film magnetic head, in which an element formation surface and an opposed-to-medium surface are perpendicular to each other, it is quite difficult in terms of design to dispose the electron discharge source so that electrons are discharged from the opposed-to-medium surface or to dispose the laser light source so that the light beam becomes parallel to the element formation surface. For the reason, it becomes difficult to irradiate electrons or near-field light accurately to a record position of the magnetic recording layer, then to apply write field thereon.

In the heat-assisted magnetic recording system, not only the record position but also neighborhood thereof is heated by heat conduction. Thus, the heat fluctuation of the magnetic particles may be even more accelerated. Further, because the temperature distribution of heated portions or the write field distribution of the magnetic head are not uniform, it is difficult to magnetically reverse or demagnetize only desired record positions. Consequently, it becomes difficult to write data with high accuracy and high quality.

Further, it is preferable to use a material having a large reduction rate of the coercive force along with temperature increase as the material of the magnetic recording layer in order to lower the coercive force temporarily by heating. However, the development of such new material can be a large burden, and in the developed new material, the heat fluctuation may be increased along with increase in ambient temperature.

BRIEF SUMMARY OF THE INVENTION

Accordingly, an object of the present invention is to provide a thin-film magnetic head capable of writing data with high accuracy on a magnetic recording medium having high coercive force without heating, an HGA having this thin-film magnetic head and a magnetic recording/reproducing apparatus having this HGA.

Another object of the present invention is to provide a thin-film magnetic head capable of writing data with high accuracy on the magnetic recording medium having high coercive force without heating, which further enables downsizing and reduction of cost to be achieved.

Still another object of the present invention is to provide a magnetic recording method capable of writing data on the magnetic recording medium having high coercive force with high accuracy without heating.

Before describing the present invention, terms used herein will be defined. In a multilayer structure formed on/above the element formation surface of a substrate, a layer or a portion of the layer located closer to the substrate than a standard layer is referred to as being located "lower" than, "beneath" or "below" the standard layer, and a layer or a portion of the layer located on the stacking direction side in relation to a standard layer is referred to as being located "upper" than, "on" or "above" the standard layer. For example, "a lower magnetic pole layer is provided on an insulating layer" means that the lower magnetic pole layer is provided on the stacking direction side in relation to the insulating layer.

According to the present invention, a thin-film magnetic head is provided, which comprises an electromagnetic coil element comprising:

a main magnetic pole formed on an element formation surface of a substrate having an opposed-to-medium surface, a write magnetic field generated from an end portion on the opposed-to-medium surface side of the main magnetic pole during write operation of data signals;

an auxiliary magnetic pole, a portion distant from an end portion on the opposed-to-medium surface side of the auxiliary magnetic pole magnetically connected to the main magnetic pole; and a write coil formed so as to pass through at least between the main magnetic pole and the auxiliary magnetic pole, for generating the write magnetic field, a part of the write coil having a layered structure of: a resonance coil layer for generating a resonance magnetic field having ferromagnetic resonance frequency of a magnetic recording layer of a magnetic recording medium or having a frequency in the vicinity thereof; and a write coil layer, the resonance coil layer and the write coil layer sandwiching an insulating layer therebetween.

In the thin-film magnetic head according to the present invention, a part of the write coil serves as a resonance coil layer. When a resonance current having a ferromagnetic resonance frequency of a magnetic recording layer of a magnetic recording medium or having a frequency in the vicinity thereof is applied to the resonance coil layer, a resonance magnetic field for ferromagnetic resonance is generated between the end portions of the main magnetic pole and of the auxiliary magnetic pole. The application of the resonance magnetic field to the magnetic recording medium during writing widely reduces the required intensity of the write magnetic field. As a result, the write operation can be performed with high accuracy on a magnetic recording medium having high coercive force without heating.

Further, because the resonance coil layer is formed as a part of the write coil, the quantity of turns of coils of the resonance coil layer is limited, so that the increase of effective inductance in the microwave band is further suppressed. Additionally, the interference of the drive current can be reduced largely compared with a case where the resonance coil layer is provided separately from the write coil.

In the above-described head, the resonance coil layer preferably extends to an outermost periphery of the write coil. And a tap is preferably provided in an end portion of the resonance coil layer and in an intermediate portion of the write coil.

Further, it is preferable that the auxiliary magnetic pole is positioned on the trailing side of the main magnetic pole, and an auxiliary shield is provided on the leading side of the main magnetic pole. In the case, it is also preferable that a portion distant from an end portion on the opposed-to-medium surface side of the auxiliary shield is magnetically connected to the main magnetic pole.

Further, in the above-described head, it is preferable that a leading-side write coil is provided, which is formed so as to pass through at least between the main magnetic pole and the auxiliary shield, connected electrically in series with the write coil, and wound in an opposite direction to the write coil.

Further, in the case that the leading-side write coil is provided, it is preferable that a part of the leading-side write coil has a layered structure of a write coil layer and a leading-side resonance coil layer which sandwich an insulating layer therebetween, and wherein an end portion of the resonance coil layer which is an intermediate portion of the write coil and an end portion of the leading-side resonance coil layer which is an intermediate portion of the leading-side write coil are electrically connected to a connecting portion.

According to the present invention, a thin-film magnetic head is further provided, which comprises an electromagnetic coil element comprising:

a main magnetic pole formed on an element formation surface of a substrate having an opposed-to-medium surface, a write magnetic field generated from an end portion on the opposed-to-medium surface side of the main magnetic pole during write operation of data signals;

an auxiliary magnetic pole, a portion distant from an end portion on the opposed-to-medium surface side of the auxiliary magnetic pole magnetically connected to the main magnetic pole; and a write coil formed so as to pass through at least between the main magnetic pole and the auxiliary magnetic pole, for generating the write magnetic field, a part of the write coil serving as a resonance coil portion for generating a resonance magnetic field having ferromagnetic resonance frequency of a magnetic recording layer of a magnetic recording medium or having a frequency in the vicinity thereof.

In the thin-film magnetic head according to the present invention, a part of the write coil serves as a resonance coil portion. When a resonance current having a ferromagnetic resonance frequency of a magnetic recording layer of a magnetic recording medium or having a frequency in the vicinity thereof is applied to the resonance coil portion, a resonance magnetic field for ferromagnetic resonance is generated between the end portions of the main magnetic pole and of the auxiliary magnetic pole. The application of the resonance magnetic field to the magnetic recording medium during writing widely reduces the required intensity of the write magnetic field. As a result, the write operation can be performed with high accuracy on a magnetic recording medium having high coercive force without heating.

Further, because the resonance coil portion is formed as a part of the write coil, the quantity of turns of coils of the resonance coil portion is limited, so that the increase of effective inductance in the microwave band is further suppressed. Additionally, the interference of the drive current can be reduced largely compared with a case where the resonance coil portion is provided separately from the write coil.

In the above-described head, the resonance coil portion preferably serves as a portion including a current path on the outermost periphery of the write coil. And it is also preferable that a tap is provided in an intermediate portion of the write coil, and the resonance coil portion serves as a portion between the tap and an end on the outer periphery side of the write coil. Further, it is also preferable that the auxiliary magnetic pole is positioned on the trailing side of the main magnetic pole, and an auxiliary shield is provided on the leading side of the main magnetic pole.

Further, in the above-described head, it is preferable that the write magnetic field has a direction perpendicular or substantially perpendicular to a surface of the magnetic recording layer of a magnetic recording medium in a position of the magnetic recording layer, and the resonance magnetic field has a direction in-plane or substantially in-plane of the surface of the magnetic recording layer. Further, the maximum value of the resonance magnetic field is preferably set to be smaller than the maximum value of the write magnetic field in a position of the magnetic recording layer of the magnetic recording medium.

According to the present invention, an HGA is further provided, which comprises: the above-described thin-film magnetic head; a supporting mechanism for supporting the thin-film magnetic head; and a transmitting portion having a plurality of transmission channels, for transmitting a write current to be applied to the write coil and a resonance current to be applied to the resonance coil layer/portion or to the resonance coil layer and the leading-side resonance coil layer.

In the HGA according to the present invention, an impedance adjusting means is preferably provided between the thin-film magnetic head and the transmitting portion, for matching an impedance of the thin-film magnetic head and an impedance of the plurality of transmission channels. And further, the impedance adjusting means preferably has at least one adjustment resistor portion and at least one adjustment capacitor portion.

According to the present invention, a magnetic recording/reproducing apparatus is further provided, which comprises: at least one HGA; at least one magnetic recording medium to which the thin-film magnetic head performs read and write operations; a write current source connected to at least two of the plurality of transmission channels, for supplying the write current to the write coil; and a resonance current source connected to at least two of the plurality of transmission channels, for supplying the resonance current for generating the resonance magnetic field in the resonance coil layer/portion or in the resonance coil layer and the leading-side resonance coil layer.

In the magnetic recording/reproducing apparatus according to the present invention, preferably obtained is matching between an output impedance of the resonance current source and a sum of characteristic impedances of at least two of the plurality of transmission channels connected to the resonance current source. Further, preferably obtained is matching between an output impedance of the write current source and a sum of characteristic impedances of at least two of the plurality of transmission channels connected to the write current source.

Further, in the above-described magnetic recording/reproducing apparatus, at least one magnetic recording medium preferably has a magnetic recording layer and a soft-magnetic backing layer provided on the medium substrate side of the magnetic recording layer. Further, the at least one magnetic recording medium is also preferably a discrete track medium or a patterned medium.

According to the present invention, a magnetic recording method is further provided, which comprises steps of:

generating a resonance magnetic field having a ferromagnetic resonance frequency of a magnetic recording layer of a magnetic recording medium or having a frequency in the vicinity thereof, by applying a current having a frequency in microwave band to a part of a write coil;

generating a write magnetic field by applying a write current to the write coil while applying the resonance magnetic field to the magnetic recording layer; and performing a write operation by applying the write magnetic field to the magnetic recording layer.

In the method according to the present invention, it is preferable that the write coil comprises a portion having a structure in which the resonance coil layer and the write coil layer are stacked so that the resonance coil layer and the write coil layer sandwich an insulating layer, and the resonance coil layer is used as the part of the write coil. Further, a portion including a current path on the outermost periphery of the write coil is preferably used as the part of the write coil. And it is also preferable that the resonance magnetic field is applied in a direction in-plane or substantially in-plane of a surface of the magnetic recording layer, and the write magnetic field is applied in a direction perpendicular or substantially perpendicular to the surface of the magnetic recording layer.

Further, in the above-described magnetic recording method, the maximum value of the resonance magnetic field is preferably set to be smaller than the maximum value of the write magnetic field in a position of the magnetic recording layer of the magnetic recording medium. Furthermore, an advance resonance magnetic field having a ferromagnetic resonance frequency of the magnetic recording layer or a frequency in the vicinity thereof is preferably applied to the magnetic recording layer preliminarily, before the write operation is performed by applying the write magnetic field to the magnetic recording layer while applying the resonance magnetic field.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIG. 2 shows a perspective view schematically illustrating the entire thin-film magnetic head according to the present invention;

FIG. 12 shows a schematic diagram of a circuit comprising a current source, a transmitting portion, an impedance adjusting portion and a thin-film magnetic head, for explaining impedance matching in the magnetic recording/reproducing apparatus according to the present invention;

FIG. 14 shows a schematic diagram of a circuit including a current source, a transmitting portion, an impedance adjusting portion and a thin-film magnetic head, for explaining the impedance matching in the magnetic recording/reproducing apparatus of the fifth embodiment.

DETAILED DESCRIPTION OF THE INVENTION

Figure 1:
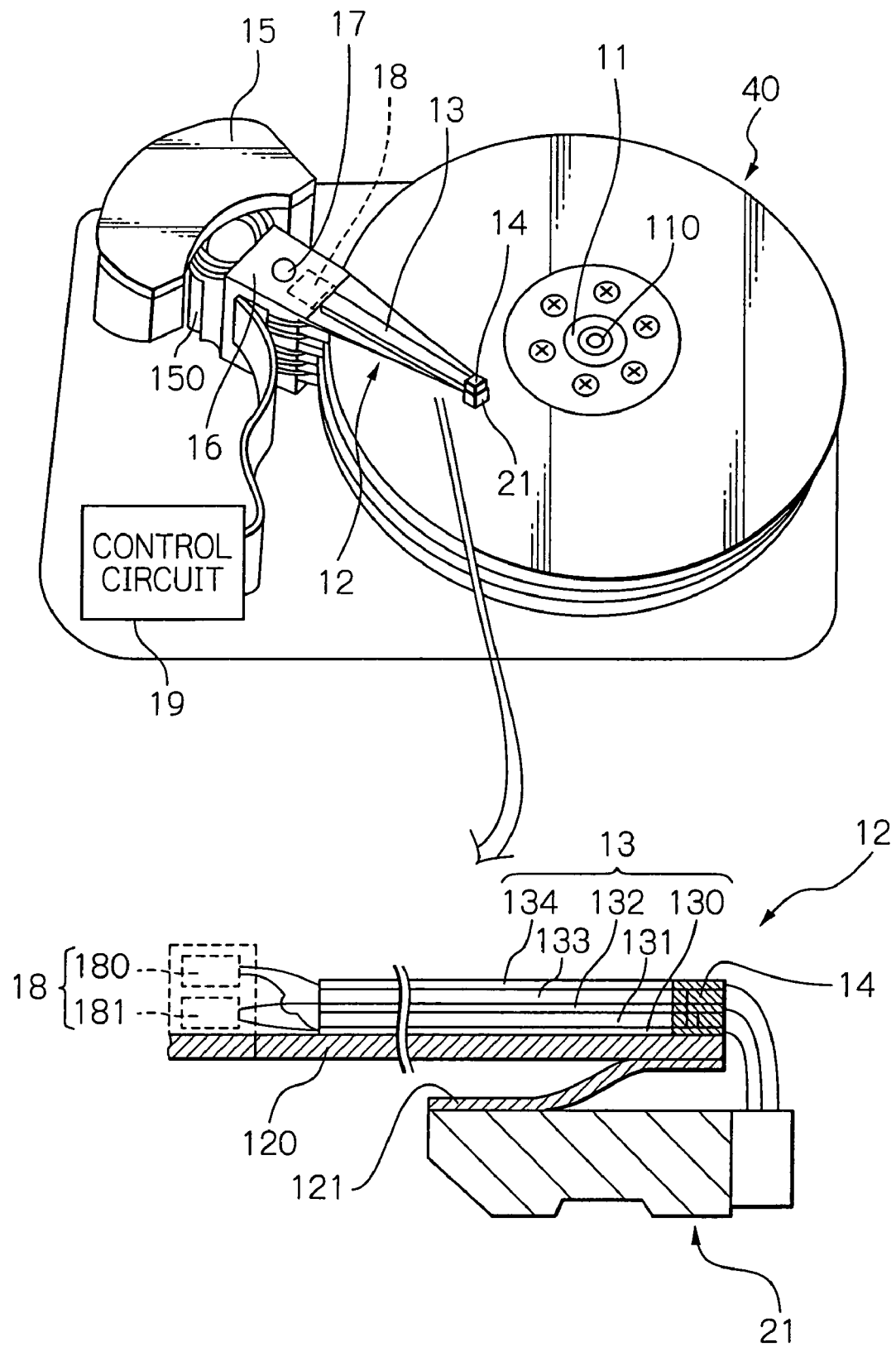
FIG. 1 shows a perspective view schematically illustrating a main part of an embodiment of a magnetic recording/reproducing apparatus according to the present invention.

FIG. 1 shows a perspective view schematically illustrating a main part of an embodiment of a magnetic recording/reproducing apparatus according to the present invention.

FIG. 1 indicates a magnetic disk drive apparatus as a magnetic recording/reproducing apparatus. Reference numeral 40 denotes a magnetic disk as a magnetic recording medium, a plurality of which are provided to rotate around a spindle 110 of a spindle motor 11, reference numeral 12 denotes a head gimbal assembly (HGA) which makes a thin-film magnetic head (slider) 21 for writing/reading data to the magnetic disk 40 opposed to the surface of the magnetic disk 40 appropriately, reference numeral 15 denotes an assembly carriage device for positioning the thin-film magnetic head 21 above a track of the magnetic disk 40, and reference numeral 19 denotes a recording/reproducing and resonance control circuit which controls the write/read operations of the thin-film magnetic head 21 and further controls a resonance current that is a high frequency current for resonance applied to a resonance coil layer or a resonance coil portion (on the leading side) described later.

The assembly carriage device 15 is provided with a voice coil motor (VCM) 150 and a plurality of drive arms 16 are attached to the VCM 150. These drive arms 16 can be swung around a pivot bearing axis 17 by the VCM 50 and are stacked along this axis. The HGA 12 is attached to the front end portion of this drive arm 16. The magnetic disks 40, the drive arms 16 and the HGAs 12 may be provided in each single quantity.

As shown in FIG. 1, the HGA 12 includes a thin-film magnetic head 21, a load beam 120 and flexure 121 as a supporting mechanism, a transmission portion 13 having a plurality of transmission channels 130, 132 and 134 for transmitting a current to be applied to the write head element, and an impedance adjusting portion 14 that is provided between the thin-film magnetic head 21 and the transmitting portion 13 for matching impedances of the thin-film magnetic head 21 and the plurality of the transmission channels 130, 132 and 134. Although not shown, the HGA 12 further includes wiring members for taking out a read output voltage by applying a constant current to the read head element.

The thin-film magnetic head 21 is attached to one end of the flexure 121 having elasticity, and a suspension as a supporting mechanism for supporting the thin-film magnetic head 21 is constituted of this flexure 121 and a load beam 120 to which the other end of the flexure 121 is attached.

The transmitting portion 13 includes the three transmission channels 130, 132 and 134 made of conductive material such as Cu and insulating layers 131 and 133 stacked between the transmission channels 130 and 132 and between the transmission channels 132 and 134 respectively, formed of a electrically insulating material such as polytetrafluoroethylene (PTFE). A current source 18 includes a write current source 180 that generates a write current to be applied to the write coil of the write head element and a resonance current source 181 that generates a resonance current to be applied to the resonance coil layer or resonance coil portion (on leading side) that is a part of the write coil as described later. The current source 18 supplies the write current and the resonance current to the write head element of the thin-film magnetic head 21 through the transmitting portion 13. This current source 18 is a part of the recording/reproducing and resonance control circuit 19, and may be attached to the HGA 12 or the drive arm 16, or may be provided within the recording/reproducing and resonance control circuit 19.

The write current source 180 is connected to the transmission channels 130 and 134 with impedance matching, and the resonance current source 181 is connected to the transmission channels 130 and 132 with impedance matching. The impedance adjusting portion 14 takes a role of matching the impedance between the transmission channels 130 and 134 and the write coil of the thin-film magnetic head 21 and of matching the impedance between the transmission channels 130 and 132 and the resonance coil portion of the thin-film magnetic head 21. This connection structure corresponds to the first to fourth embodiments described later.

The recording/reproducing and resonance control circuit 19, although not shown, may include, for example, the above-described current source 18, a head amplifier and read/write (R/W) channel which execute signal transmission/reception and signal processing in write and read operations, a controller for executing interface control and so on, and a CPU for controlling the entire circuit.

The structure of the impedance adjusting portion 14 and the method for matching the impedance will be described in detail later.

FIG. 2 shows a perspective view schematically illustrating the entire thin-film magnetic head 21 according to the present invention. The shown structure of the write coil corresponds to the first to fourth embodiments described later.

As shown in FIG. 2, the thin-film magnetic head 21 includes a slider substrate 210 having an air bearing surface (ABS) 2100 processed to obtain an appropriate flying height, a magnetic head element 32 provided on/above an element formation surface 2101, which is to be one of side surfaces when the ABS 2100 is viewed as bottom, provided perpendicular to the ABS 2100, an overcoat 39 provided on the element formation surface 2101 covering the magnetic head element 32 and five terminal electrodes 350, 351, 360, 361 and 362 exposed from a layer surface of the overcoat 39.

The magnetic head element 32 includes a magnetoresistive (MR) effect element 33 that is a read head element for reading data and an electromagnetic coil element 34 which is a write head element for writing data. The terminal electrodes 350 and 351 are connected electrically to the MR effect element 33 and the terminal electrodes 360, 361 and 362 are connected electrically to the electromagnetic coil element 34. The terminal electrodes 350, 351, 360, 361 and 362 are not limited to be provided on positions shown in FIG. 2 and may be provided on a slider end surface 212 on the opposite side to the ABS 2100, for example.

An end of each of the MR effect element 33 and the electromagnetic coil element 34 reaches a slider end surface 211 on the ABS 2100 side. The slider end surface 211 is in the opposed-to-medium surface except the ABS 2100 of the thin-film magnetic head 21, which is opposed to the magnetic disk, and the slider end surface 211 is constituted mainly of an end surface of the overcoat 39. With the end of these elements opposed to the magnetic disk, a read operation by sensing signal field and a write operation by applying signal field are performed. Extremely thin diamond-like carbon (DLC), for example, may be applied onto the ends and proximity thereof of these elements reaching the slider end surface 211.

The electromagnetic coil element 34 includes a main magnetic pole layer 34 which serves as a main magnetic pole for generating write field from the end portion on the ABS 2100 side (slider end surface 211 side) of the electromagnetic coil element 34 during writing data, an auxiliary magnetic pole layer 345 which serves as an auxiliary magnetic pole in which a portion apart from the end portion on the ABS 2100 side (slider end surface 211 side) is magnetically connected with the main magnetic pole layer 340, and a write coil 343 which has a spiral shape and is formed so as to pass through at least between the main magnetic pole layer 340 and the auxiliary magnetic pole layer 345 in a single turn.

A part of the write coil 343 has a three-layered structure in which a resonance coil layer 3430 and a write coil layer 343b are stacked with a insulating layer sandwiched therebetween, and the other part of the write coil 343 is a single-layer write coil portion 343a. By supplying electricity from the end portion on the outer periphery side up to the end portion on the inner periphery side of the write coil 343 via the write coil layer 343b and the write coil portion 343a with use of the terminal electrodes 360 and 361, a magnetic flux corresponding to write field can be generated in a magnetic circuit formed with the main magnetic pole layer 340 and the auxiliary magnetic pole layer 345. On the other hand, the resonance coil layer 3430 which is a part of this write coil 343 generates resonance field which is a high frequency magnetic field in a micro wave band having a ferromagnetic resonant frequency of the magnetic recording layer in the magnetic disk or a frequency around the ferromagnetic resonant frequency.

The resonance coil layer 3430 is provided as one of the three-layered structure in the part ranging from the end portion on the outer periphery side of the write coil 343 to an intermediate portion of the write coil 343, and when supplied with electricity through the terminal electrodes 360 and 362, a magnetic flux corresponding to the resonant magnetic field is generated in a magnetic circuit formed with the main magnetic pole layer 340 and the auxiliary magnetic pole layer 345. This resonance coil layer 3430 extends to the outermost periphery of the write coil 343.

A tap lead layer 372 which serves as a tap is connected electrically to the end portion on the inner periphery side of the resonance coil layer 3430 which is an intermediate portion of the write coil 343 and the end portion on the outer periphery side of the write coil portion 343a. That is, the tap lead layer 372 connects electrically the end portion on the inner periphery side of the resonance coil layer 3430 and the end portion of the outer periphery side of the write coil portion 343a to the terminal electrode 362. The end of the inner periphery side of the write coil layer 343b and the end on the outer periphery side of the coil portion 343a are electrically connected directly. Here, the write coil layer 343b and the write coil portion 343a may be formed integrally of a single conductive material. The resonance coil layer 3430 and the end portion on the outer periphery side of the write coil layer 343b are connected to the terminal electrode 360 with a lead layer 370 and the end portion on the inner periphery side of the write coil portion 343a and the terminal electrode 361 are connected electrically with a lead layer 371.

By forming the resonance coil layer 3430 as a part of the write coil 343 as described above, the quantity of turns of coils of the resonance coil layer 3430 is limited, so that the increase of effective inductance in the micro wave band is further suppressed. Additionally, the interference of the drive current can be reduced largely compared with a case where the resonance coil layer is provided separately from the write coil 343.

Because the resonance coil layer 3430 extends up to the outermost periphery of the write coil 343, both the resonance coil layer 3430 and the write coil 343 can be brought close enough to a trailing gap, thereby improving the generation efficiencies of the write field and the resonance magnetic field.

Figure 3A:
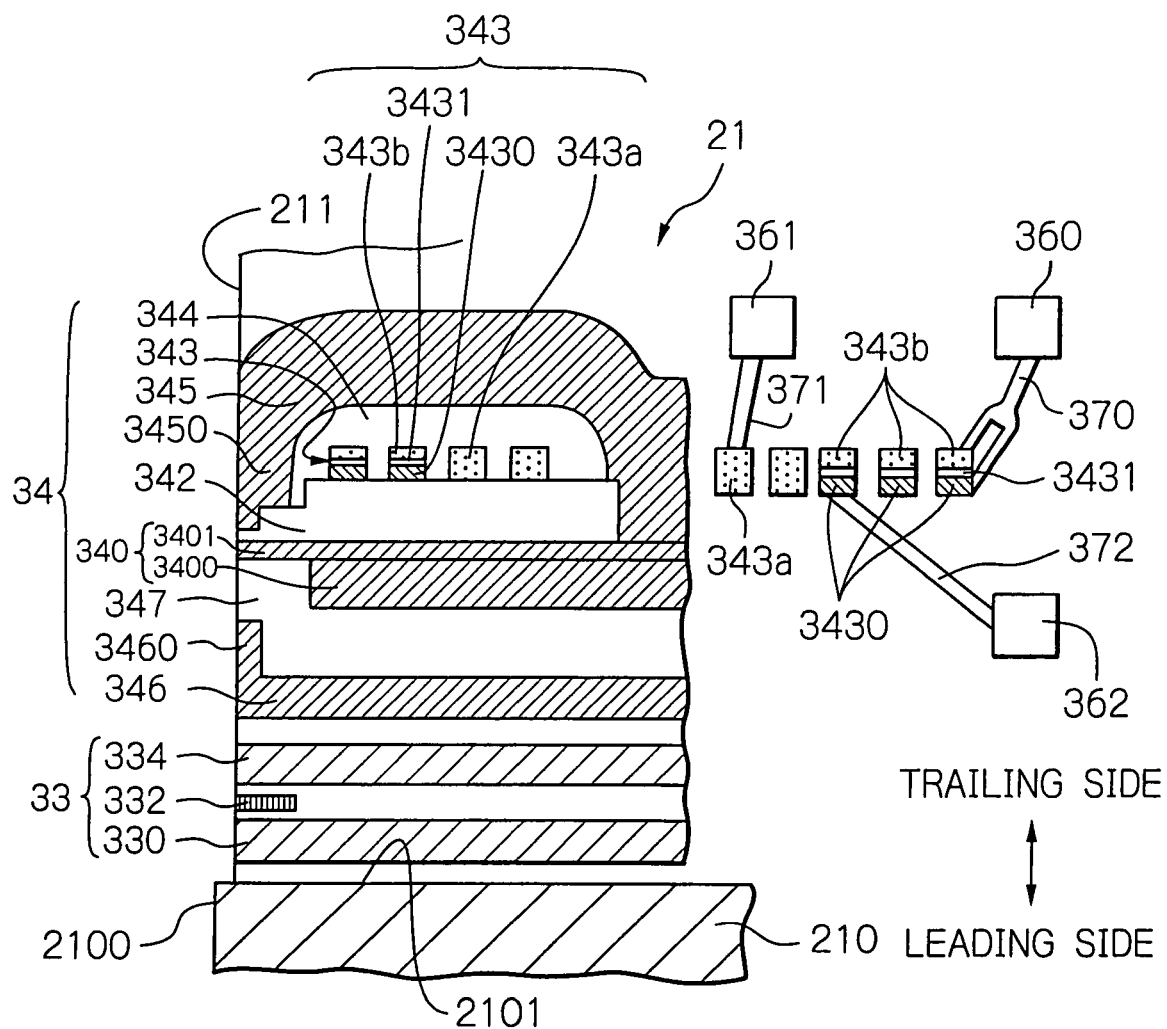
FIG. 3a shows a cross-sectional view taken along line A-A of FIG. 2 illustrating the structure of a major portion in the first embodiment of the thin-film magnetic head according to the present invention.
Figure 3B:
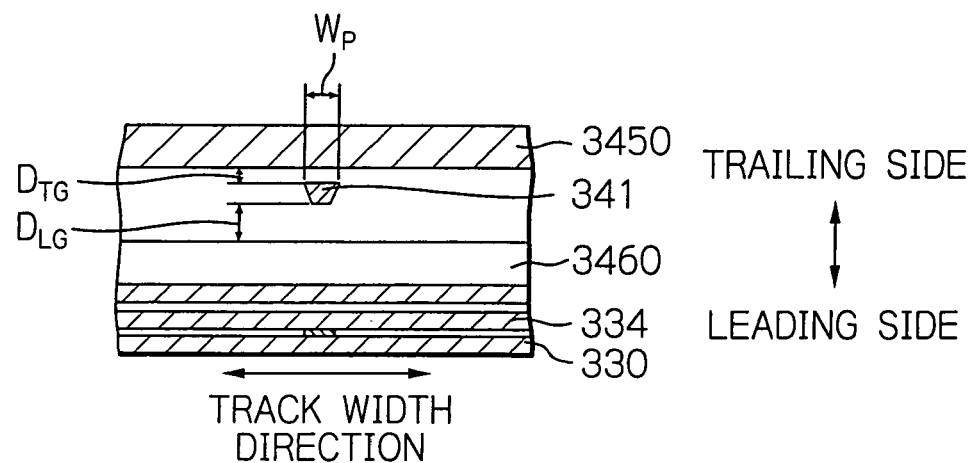
FIG. 3b shows a plain view showing the structure in the slider end surface as viewed from the ABS side.

FIG. 3a shows a cross-sectional view taken along line A-A of FIG. 2 illustrating the structure of a major portion in the first embodiment of the thin-film magnetic head according to the present invention, and FIG. 3b shows a plain view showing the structure in the slider end surface 211 as viewed from the ABS 2100 side.

As shown in FIG. 3a, reference numeral 210 denotes a slider substrate composed of ALTIC ($Al_2O_3$—TiC) or the like and has the ABS 2100 to be opposed to the magnetic disk surface. The MR effect element 33, the electromagnetic coil element 34 and the overcoat 39 for protecting these elements are mainly formed on/above the element formation surface 2101 of this slider substrate 210.

The MR effect element 33 includes an MR effect multilayer 332 and a lower shield layer 330 and an upper shield layer 334 which sandwich this multilayer 332. The MR effect multilayer 332 includes a current-in-plane (CIP) giant magnetoresistive (GMR) multilayered film, a current-perpendicular-to-plane (CPP) GMR multilayered film or a tunnel magnetoresistive (TMR) multilayered film and receives signal field from the magnetic disk with very high sensitivity. The upper and lower shield layers 334 and 330 prevent the MR effect multilayer 332 from being influenced by external magnetic field that causes noise.

If the MR effect multilayer 332 includes the CIP-GMR multilayered film, upper and lower shield gap layers for insulation are respectively provided between the upper/lower shield layers 334 and 330 and the MR effect multilayer 332. Further, an MR lead conductive layer for taking out reproduction output by supplying sense current to the MR effect multilayer 332 is formed. On the other hand, if the MR effect multilayer 332 includes the CPP-GMR effect multilayer or the TMR effect multilayer, the upper and lower shield layers 334 and 330 function as upper and lower electrode layers respectively. Although not shown in the figure, on both sides in the track width direction of the MR effect multilayer 332, formed are insulating layers, or bias insulating layers and hard bias layers for applying longitudinal bias magnetic field for stabilizing the magnetic domain structure.

When the MR effect multilayer 332 includes, for example, the TMR multilayered film, it is constituted of: an antiferromagnetic layer with a thickness of approximately 5 to 15 nm (nanometers) made of IrMn, PtMn, NiMn, RuRhMn or the like; a magnetization-pinned layer (pinned layer) composed of three-layered films in which a nonmagnetic metal film made of such as Ru is sandwiched between two ferromagnetic films made of such as CoFe and the magnetization direction is fixed by the antiferromagnetic layer; a tunnel barrier layer made of nonmagnetic dielectric film produced by oxidizing a metal film made of, for example, Al, AlCu, Mg or the like with a thickness of approximately of 0.5 to 1 nm with oxygen introduced into a vacuum chamber or with natural oxidation; and a magnetization-free layer (free layer) having a tunnel exchange coupling with the pinned layer through the tunnel barrier layer, composed of two-layered films in which a ferromagnetic film made of, for example, CoFe with a thickness of approximately 1 nm and a ferromagnetic film made of, for example, NiFe with a thickness of approximately 3 to 4 nm are sequentially stacked.

The lower shield layer 330 and the upper shield layer 334 are constituted of NiFe (permalloy or the like), CoFeNi, CoFe, FeN or FeZrN film or the like with a thickness of approximately 0.1 to 3 μm (micrometers) formed by using a pattern plating method including frame plating method.

As shown in FIG. 3a, the electromagnetic coil element 34 serves for perpendicular magnetic recording, including a main magnetic pole layer 340, a trailing gap layer 342, a write coil 343 including a resonance coil portion 343r, a coil insulating layer 344, an auxiliary magnetic pole layer 345, an auxiliary shield layer 346 as an auxiliary shield, and a leading gap layer 347.

The main magnetic pole layer 340 is a magnetic path for converging and guiding a magnetic flux generated when write current is applied to the write coil portion 343a and the write coil layer 343b of the write coil 343 toward the magnetic recording layer of the magnetic disk on which a write operation is performed. The main magnetic pole layer 340 is constituted of a main pole yoke layer 3400 and a main pole principal layer 3401. The length (thickness) in the layer thickness direction at the end portion on the ABS 2100 side (slider end surface 211 side) of the main magnetic pole layer 340 becomes smaller corresponding to the thickness of only the main pole principal layer 3401. As a result, minute write field corresponding to high recording density can be generated from this end portion during write operation. The main pole yoke layer 3400 and the main pole principal layer 3401 are formed of NiFe, CoFeNi, CoFe, FeN or FeZrN film or the like with a thickness of approximately 0.5 to 3.5 μm and of approximately 0.1 to 1 μm respectively, by using a sputtering method or a pattern plating method including frame plating method.

The auxiliary magnetic pole layer 345 and the auxiliary shield layer 346 are disposed on the trailing side and on the leading side of the main magnetic pole layer 340 respectively. While a portion apart from the end portion on the ABS 2100 side (slider end surface 211 side) of the auxiliary magnetic pole layer 345 is magnetically connected to the main magnetic pole layer 340 as described above, the auxiliary shield layer 346 is not magnetically connected to the main magnetic pole layer 340 in the present embodiment.

Respective end portions on the slider end surface 211 side of the auxiliary magnetic pole layer 345 and the auxiliary shield layer 346 are formed as the trailing shield portion 3450 and the leading shield portion 3460 having a layer cross-section larger than the other portions. The trailing shield portion 3450 is opposed to the end portion on the slider end surface 211 side of the main magnetic pole layer 340 through the trailing gap layer 342. Further, the leading shield portion 3460 is opposed to the end portion on the slider end surface 211 side of the main magnetic pole layer 340 through the leading gap layer 347. By providing the trailing shield portion 3450 and the leading shield portion 3460, the gradient of write field between the end portions of the trailing shield portion 3450 and the main magnetic pole layer 340 and between the end portions of the leading shield portion 3460 and the main magnetic pole layer 340 becomes steeper due to shunt effect of magnetic fluxes. Consequently, a jitter of the signal output is decreased thereby reducing an error rate during reading.

In the meantime, the auxiliary magnetic pole layer 345 or the auxiliary shield layer 346 may be processed appropriately, and thus side surface shields may be provided by disposing portions of the auxiliary magnetic pole layer 345 or the auxiliary shield layer 346 near the both sides in the track width direction of the main magnetic pole layer 340. In this case, the shunt effect of magnetic fluxes is intensified.

As shown in FIG. 3b, on the slider end surface 211, the end of the main magnetic pole layer 340 has side edges with a bevel angle in order to prevent unnecessary writing to an adjacent track due to influence of a skew angle generated from driving by the VCM, and has an inverted trapezoid shape with a long edge on its trailing side. This end shape may be a inverted triangle with a bottom edge on the trailing side, which is an ultimate shape as a result of reducing the short edge of the inverted trapezoid. The write field for writing data is mainly generated near the long edge on the trailing side in the end of the main magnetic pole layer 340. The gradient and intensity of this write field are optimized by adjusting a trailing gap length $D_{TG}$ which is an interval between the trailing shield portion 3450 and the end portion of the main magnetic pole layer 340 and a leading gap length $D_{LG}$ which is an interval between the leading shield portion 3460 and the end portion of the main magnetic pole layer 340.

A width $W_P$ in the track width direction of the long edge on the trailing side in the main magnetic pole layer 340 is almost a width of the write field. This width $W_P$ is also a width of the resonance magnetic field from the resonance coil portion 343r. As a result, an effective recording width is determined by the width $W_P$.

Preferably, the lengths in the layer thickness direction (thickness) of the trailing shield portion 3450 and the leading shield portion 3460 are set to several tens to several hundreds times of the thickness in the same direction of the main magnetic pole layer 340. Preferably, the trailing gap length $D_{TG}$ is about 10 to 100 nm and more preferably is about 20 to 50 nm, and the leading gap length $G_{LG}$ is 0.1 µm or more.

The auxiliary magnetic pole layer 345 and the auxiliary shield layer 346 are formed of NiFe, CoFe, Ni, CoFe, FeN or FeZrN film or the like by using, for example, a pattern plating method including frame plating method. Further, the trailing gap layer 342 and the leading gap layer 347 is formed of $Al_2O_3$, $SiO_2$, AlN or DLC film or the like with a thickness of approximately 0.1 to 3 µm by using a sputtering method, a chemical vapor deposition (CVD) method or the like.

Returning to FIG. 3a, the resonance coil layer 3430 is provided as a layer of the three-layered structure extending from the end portion on the outer periphery side of the write coil 343 to the intermediate portion of the write coil 343 as described in FIG. 2, which acts as a portion existing between the lead layer 370 and the tap lead layer 372. The resonance coil layer 3430 is separated from the write coil layer 343b across the insulating layer 3431. As for the stacking sequence in this three-layered structure, the resonance coil layer 3430, the insulating layer 3431 and the write coil layer 343b may be formed in this order as the present embodiment, however they may be formed in the opposite order. When resonance current is applied to the resonance coil layer 3430, resonance magnetic field in the longitudinal direction (in the direction parallel or substantially parallel to the magnetic disk surface and along the track) is generated between the end portion of the main magnetic pole layer 340 and the trailing shield portion 3450. By applying the resonance magnetic field in the longitudinal direction to the magnetic recording layer during writing, the write field intensity in the perpendicular direction (the direction perpendicular or substantially perpendicular to the surface of the magnetic recording layer) required for writing can be reduced largely, as described later.

The coil insulating layer 344 is provided to electrically insulate the write coil 343 from the magnetic layers and the like around by surrounding the write coil 343. The write coil portion 343a, the write coil layer 343b, the resonance coil layer 3430, the tap lead layer 372, and the lead layers 370 and 371 are constituted of Cu film or the like with a thickness of approximately 0.1 to 5 µm by using a frame plating method or a sputtering method. Further, the coil insulating layer 344 is formed of, for example, a heat-cured photoresist with a thickness of approximately 0.5 to 7 µm, by using a photolithography method or the like. The insulating layer 3431 is formed of the same photoresist as for the coil insulating layer 344, or $Al_2O_3$, $SiO_2$ or the like by using, for example, a sputtering method, a CVD method, with a thickness of approximately 0.1 to 2 µm.

Figure 4A:
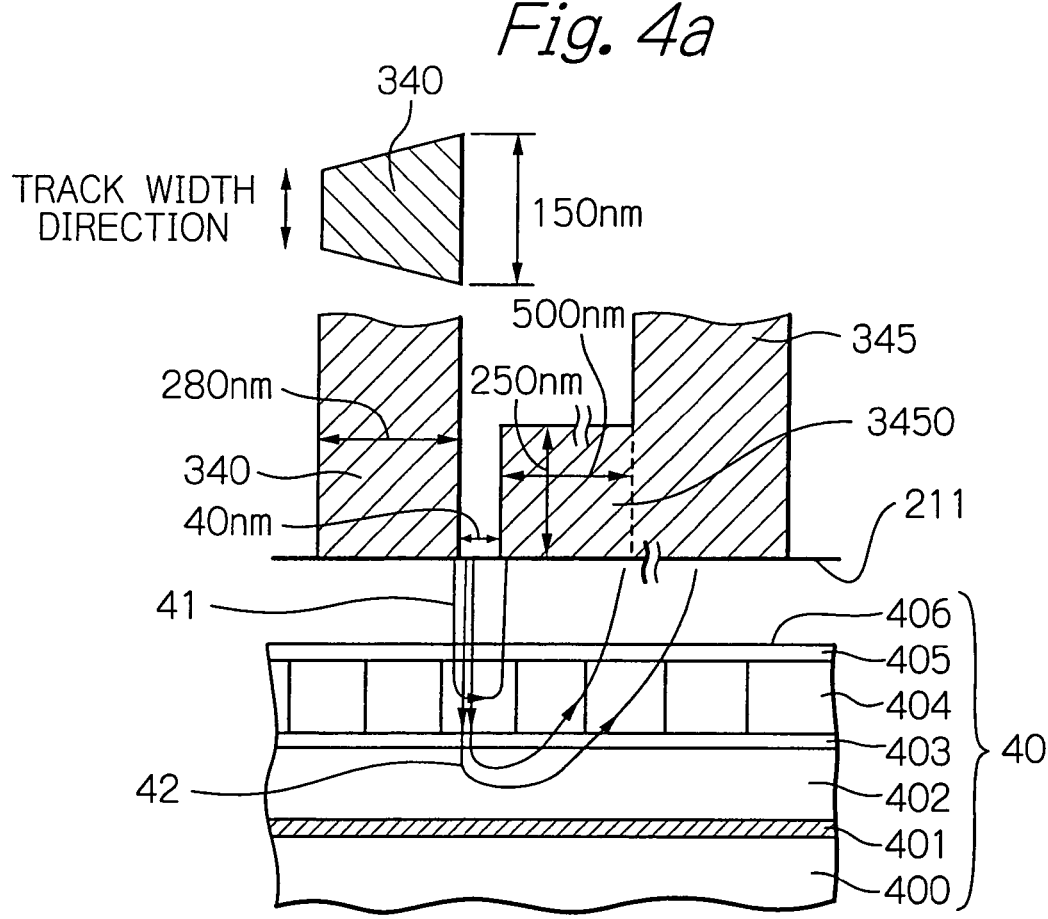
FIG. 4a shows a cross-sectional view describing a head model of the first embodiment shown in FIG. 3 for explaining the principle of the magnetic recording method using magnetic field for ferromagnetic resonance according to the present invention.
Figure 4B:
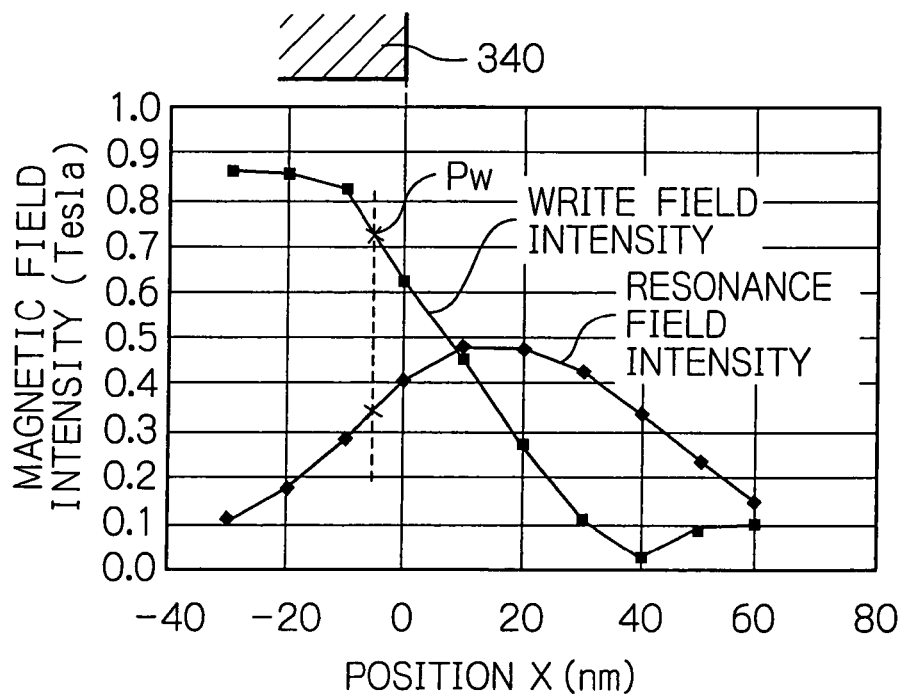
FIG. 4b shows a graph describing a simulation result of write field and resonance magnetic field around the trailing gap in the first embodiment.

FIG. 4a shows a cross-sectional view describing a head model of the first embodiment shown in FIG. 3 for explaining the principle of the magnetic recording method using magnetic field for ferromagnetic resonance according to the present invention, and FIG. 4b shows a graph describing a simulation result of write field and resonance magnetic field around the trailing gap in the first embodiment.

First, the structure of the magnetic disk 40 will be described with reference to FIG. 4a. The magnetic disk 40 is for perpendicular magnetic recording, and has a multilayered structure in which a magnetization orientation layer 401, a soft-magnetic backing layer 402 serving as a part of a magnetic flux loop circuit, an intermediate layer 403, a magnetic recording layer 404 and a protective layer 405 are stacked sequentially on the disk substrate 400. The magnetization orientation layer 401 stabilizes the magnetic domain structure of the soft-magnetic backing layer 402 by providing the soft-magnetic backing layer 402 with a magnetic anisotropy in the track width direction, to suppress spike-like noises in the reproduced output waveform. The intermediate layer 403 takes a role as a base layer for controlling the magnetization orientation and the particle diameter of the magnetic recording layer 404.

Here, the disk substrate 400 is formed of glass, NiP-coated Al alloy, Si or the like. The magnetization orientation layer 401 is formed of an antiferromagnetic material such as PtMn. The soft-magnetic backing layer 402 is formed of a soft ferromagnetic material such as a Co-based amorphous alloy, for example CoZrNb, Fe alloy, a soft-magnetic ferrite or a multilayer of soft-magnetic film/non-magnetic film. The intermediate layer 403 is formed of a non-magnetic material such as Ru alloy. The intermediate layer 403 may be a non-magnetic metal or alloy, or alloy having a low magnetic permeability as long as it can control the perpendicular magnetic anisotropy of the magnetic recording layer 404. The protective layer 405 is formed of a carbon (C) material according to a CVD method.

The magnetic recording layer 404 is formed of, for example, a CoCrPt-based alloy, CoCrPt—$SiO_2$, a FePt-based alloy or a CoPt/Pd-based artificial lattice multilayered film or the like. In this magnetic recording layer 404, the perpendicular magnetic anisotropy energy is preferably adjusted to, for example, $1 \times 10^6$ erg/cc (0.1 J/m$^3$) or more. In this case, the value of coercive force of the magnetic recording layer 404 is, for example, about 5 kOe (400 kA/m) or more. The ferromagnetic resonance frequency of this magnetic recording layer 404 has an inherent value determined by the shape, size and components of magnetic particles that constitute the magnetic recording layer 404, and is generally about in the range from 1 to 15 GHz. The ferromagnetic resonance frequency may have a single value, or may have a plurality of values as the case that spin wave resonance is generated.

Next, the principle of the magnetic recording method according to the present invention will be described. Because the magnetic flux 41 corresponding to the resonance magnetic field generated by supplying electricity to the resonance coil layer 3430 has a high frequency in micro wave band, much thereof exists due to skin effect in an area ranging from the surface on the trailing side of the main magnetic pole layer 340 up to the surface on the leading side of the trailing shield portion 3450 via the inside of the magnetic recording layer 404. If the frequency is about 10 GHz, the invasion depth of the magnetic flux 41 in the surfaces of the main magnetic pole layer 340 and the trailing shield portion 3450 is about 50 nm. As a result, the resonance magnetic field does not have a high intensity in an area on the disk substrate 400 side of the magnetic recording layer 404, and mainly has a component substantially parallel to the surface of the magnetic recording layer 404 therein.

Here, the magnetization of the magnetic recording layer 404 has a direction perpendicular or substantially perpendicular to its own layer surface. When the resonance magnetic field corresponding to the magnetic flux 41 in the in-plane direction of the magnetic recording layer 404 is applied to the layer 404, the write field intensity according to the magnetic flux 42 in the perpendicular direction required for writing can be reduced largely by adopting the resonance magnetic field with the ferromagnetic resonance frequency or a frequency in the vicinity of the frequency. The range of the vicinity of the ferromagnetic resonance frequency, in which the reduction effect of the required write field is expected, is about ±0.5 GHz.

Actually, the write field intensity in the perpendicular direction which can invert the magnetization of the magnetic recording layer 404 can be reduced by about 40% (to 60% thereof) by applying the resonance magnetic field having the ferromagnetic resonance frequency of the magnetic recording layer. That is, even though the coercive force of the magnetic recording layer 404 before applying the resonance magnetic field is about 5 kOe (400 kA/m), the coercive force can be reduced effectively to about 2.4 kOe (192 kA/m) by applying the resonance magnetic field in the in-plane direction of the magnetic recording layer.

The intensity of the resonance magnetic field is preferred to be about $0.1H_K$ to $0.2H_K$ where the $H_K$ is intensity of the anisotropy magnetic field of the magnetic recording layer, and the frequency is preferred to be about 1 to 15 GHz although it depends on the constituent material, the layer thickness or the like of the magnetic recording layer 404.

Next, the simulation analysis will be explained. As shown in FIG. 4*a*, the structure of the head model for the use in the simulation is based on the first embodiment shown in FIG. 3. The length (thickness) in the layer thickness direction of the end portion on the slider end surface 211 side of the main magnetic pole layer 340 was 280 nm, and the width in the track width direction of the trailing end of the main magnetic pole layer 340 was 150 nm. The length (thickness) in the layer thickness direction of the projecting portion of the trailing shield portion 3450 was 500 nm, and the length (height) in the direction perpendicular to the slide end surface 211 of the trailing shield portion 3450 was 250 nm. Additionally, the trailing gap length $D_{TG}$ was 40 nm.

In the graph of the simulation analysis shown in FIG. 4*b*, the horizontal axis indicates a position X in the track direction (direction perpendicular to the track width direction on the slider end surface 211) of this head model, with the original point set at the end on the trailing side of the main magnetic pole layer 340 and the positive direction set to a direction toward the trailing side. The vertical axis indicates the intensities of the write field in the perpendicular direction and the resonance magnetic field in the longitudinal direction, which are defined to be the maximum amplitude intensities at the intermediate position along the thickness direction in the magnetic recording layer 404.

According to FIG. 4*b*, the write field intensity decreases with a large magnetic field gradient across the home position (the end on the trailing side of the main magnetic pole layer 340) as it goes toward the trailing side. On the other hand, the resonance magnetic field increases across the home position inversely to the write magnetic field intensity so that it reaches a peak near the position X=15 nm. Because the original coercive force of the magnetic recording layer 404 is decreased to a smaller effective coercive force by the resonance magnetic field, the write can be carried out sufficiently at an operating point ($P_W$ in the Figure) in which the write operation could not be executed under the original coercive force.

The intensity of the resonance magnetic field superimposed on the write magnetic field at the write operation point $P_W$ is smaller than the write magnetic field intensity. Actually, if the intensity of the resonance magnetic field is excessively large, the time required for the reversal of magnetization of the magnetic recording layer 404 by the write magnetic field is prolonged. However, because according to the present invention, the resonance magnetic field intensity is set to be smaller than the write magnetic field intensity, the reversal of magnetization or the demagnetization of a record portion of the magnetic recording layer 404 can be carried out efficiently.

Because the resonance magnetic field is generated around the trailing end of the main magnetic pole layer 340, the resonance magnetic field and the write magnetic field can be applied to a record portion of the magnetic recording layer securely at the same time. Consequently, the write accuracy and quality of data signal are improved.

Because the coercive force of the magnetic recording layer is set to be large, the heat fluctuation of magnetization is suppressed. Therefore, stability of the record bit in which the data signal is written is improved, so that reliability of data storage is improved.

According to the above-described magnetic recording method, it is understood that data signal can be written highly accurately on the magnetic disk with high coercive force without relying on heat assist (on heating). Further, in the above-described thin-film magnetic head, such a magnetic recording method can be achieved without use of any special device that turns to a large load, such as an electron discharge source and a laser beam source, and thus downsizing and reduction of cost can be achieved. Particularly, because the first embodiment does not require the provision of a new coil, downsizing and reduction of cost are achieved more securely.

Figure 5:
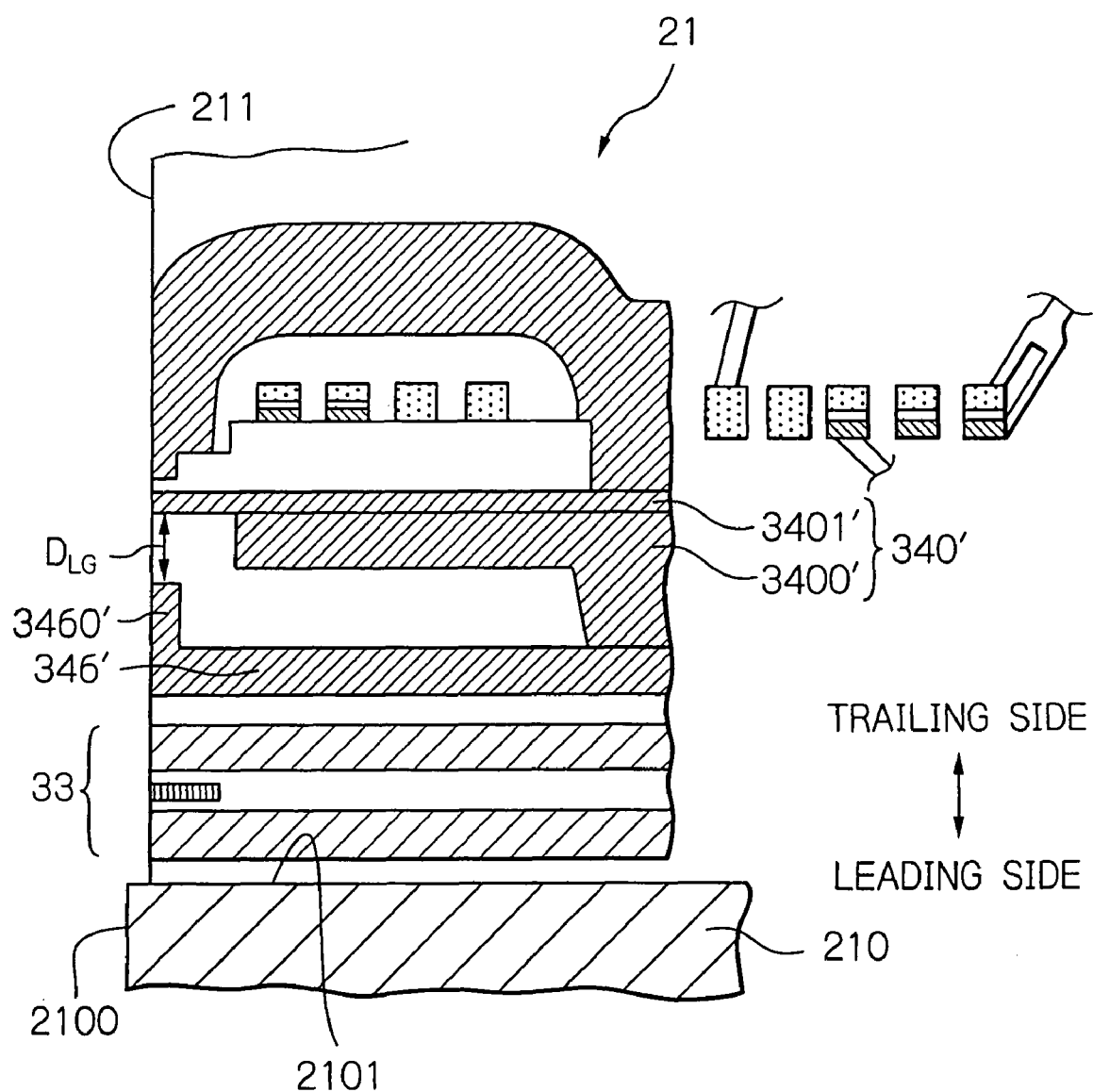
FIG. 5 shows a cross-sectional view taken along the line A-A of FIG. 2, illustrating a main portion of the second embodiment of the thin-film magnetic head according to the present invention.

FIG. 5 shows a cross-sectional view taken along the line A-A of FIG. 2, illustrating a main portion of the second embodiment of the thin-film magnetic head according to the present invention.

As shown in FIG. 5, this embodiment has the same structure as the first embodiment shown in FIG. 3 except that an auxiliary shield layer 346' and a main magnetic pole layer 340' are connected magnetically. Therefore, the description of other structure than the both layers will not be repeated.

According to this embodiment, as shown in FIG. 5, a portion separated from an end portion on the slider end surface 211 side of a main pole yoke layer 3400' possessed by a main magnetic pole layer 340' is connected to the auxiliary shield layer 346' magnetically. In this case, the shunt effect of magnetic flux possessed by a leading shield portion 3460' which is an end portion on the slider end surface 211 side of the auxiliary shield layer 346' is further increased. As a consequence, the magnetic field gradient of the write magnetic field can be increased even if the leading gap length $D_{LG}$ is not made so small, thereby increasing the possibility of the head design.

Figure 6:
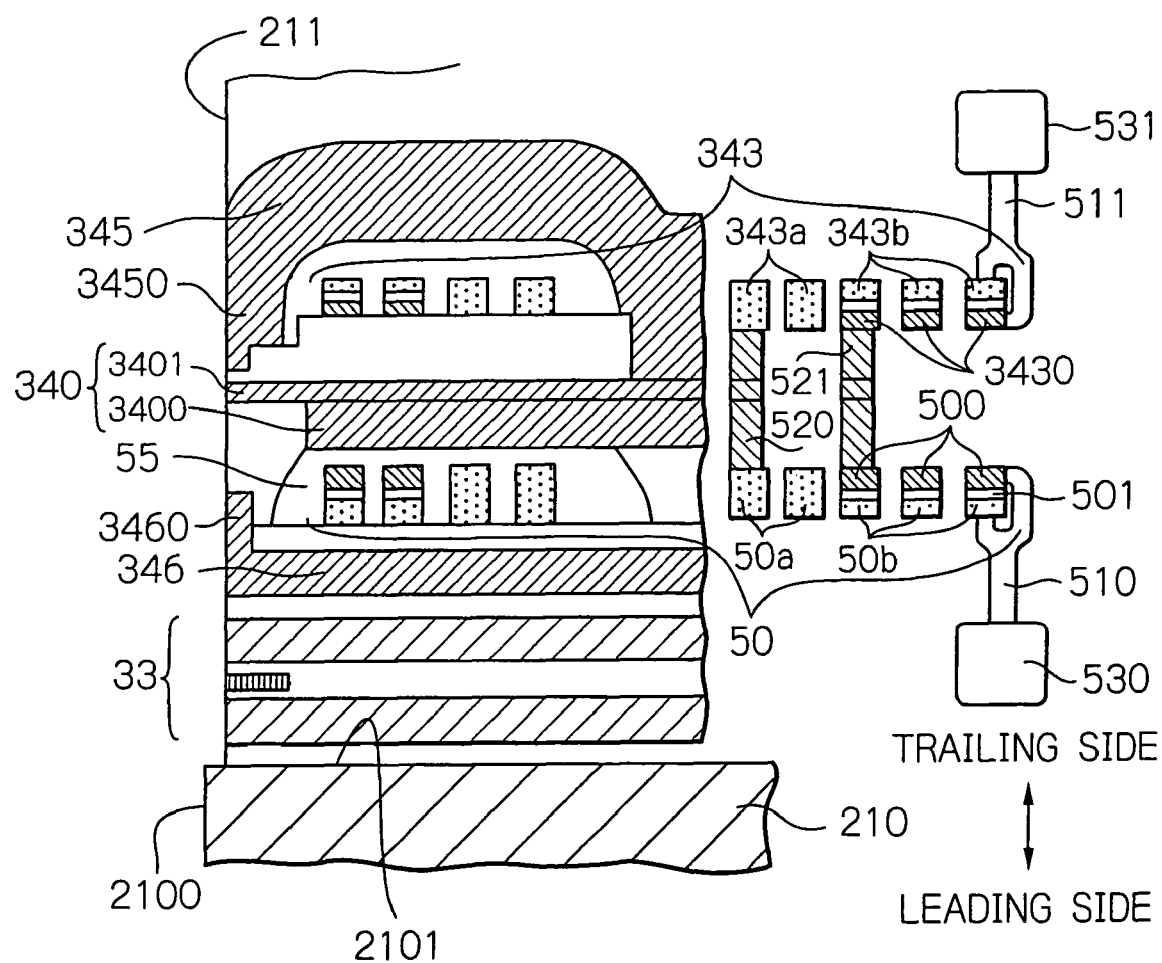
FIG. 6 shows a cross-sectional view taken along the line A-A illustrating a main portion of the third embodiment of the thin-film magnetic head according to the present invention.

FIG. 6 shows a cross-sectional view taken along the line A-A illustrating a main portion of the third embodiment of the thin-film magnetic head according to the present invention.

According to this embodiment as shown in FIG. 6, in addition to the first embodiment shown in FIG. 3, provided are: a leading-side write coil 50 as a write coil on the leading side formed to pass through at least once between the main magnetic pole layer 340 and the auxiliary shield layer 346 in a single turn; and a leading-side coil insulating layer 55 formed to surround the leading-side write coil 50. In the meantime, this embodiment is the same as the first embodiment including a point that the main magnetic pole layer 340 and the auxiliary leading layer 346 are not connected magnetically also, except the connection structure among the leading-side write coil 50, the leading-side coil insulating layer 55, the leading-side write coil 50 and the write coil 343. Therefore, the description thereof will not be repeated.

As shown in FIG. 6, a part of the leading-side write coil 50 has a three-layered structure in which a leading-side write coil layer 50*b* and a leading-side resonance coil layer 500 are laminated sandwiching an insulating layer 501 like the write coil 343, while the remaining portion is formed as a leading-side write coil portion 50a of a single layer. Here, the leading-side write coil layer 50b is separated from the leading-side resonance coil layer 500 across the insulating layer 501. The order of the arrangement of this three-layered structure may be the leading-side write coil layer 50b, the insulating layer 501 and the leading-side resonance coil layer 500 like this embodiment, or a reverse order may be adopted. To facilitate the connection by a connecting portion 521 described later, it is set in a reverse order to the arrangement of the three-layered structure of the write coil 343. Further, the end on the inner periphery side of the leading-side write coil layer 50b is connected directly to the end of the outer periphery side of the leading-side write coil portion 50a electrically. Here, the leading-side write coil may be formed of a single conductive material in which the leading-side write coil layer 50b and the leading-side write coil portion 50a are integrated.

The leading-side write coil 50 generates magnetic flux acting as write magnetic field in a magnetic circuit formed of the main magnetic pole layer 340 and the auxiliary shield layer 346 when electricity is supplied between the end portion on the outer periphery side of the leading-side write coil layer 50b and the end portion on the inner periphery side of the leading-side write coil portion 50a. Here the leading-side write coil 50 and the write coil 343 are connected in series by electrically connecting between the end portions on the inner periphery side (end portions on the inner periphery side of the leading-side write coil portion 50a and the write coil portion 343a) with a connecting portion 520 composed of conductive layers. The leading-side write coil 50 has a spiral shape wound in an opposite direction to the write coil 343.

As a consequence, by applying the write current between the end portion on the outer periphery side of the leading-side write coil 50 and the end portion on the outer periphery side of the write coil 343, write magnetic fields generated by both coils are superimposed at the position of the main magnetic pole layer 340 to intensify each other, thereby achieving a stronger write magnetic field. In the meantime, instead of the terminal electrodes 360, 361 and 362, two terminal electrodes 530 and 531 disposed at similar positions of those terminals are used in this embodiment. That is, the end portions on the outer periphery side of the leading-side write coil 50 (end portions on the outer periphery side of the leading-side write layer 50b and the leading-side resonance coil layer 500) and the end portions on the outer periphery side of the write coil 343 (end portion on the outer periphery side of the write layer coil 343b and the resonance coil layer 3430) are connected to the terminal electrodes 530, 531 through the lead layers 510, 511, respectively.

According to this embodiment, the end portion on the inner peripheral side of the leading-side resonance coil layer 500 which serves as an intermediate portion of the leading-side write coil 50 and the end portion on the inner peripheral side of the resonance coil layer 3430 which serves as an intermediate portion of the write coil 343 are connected electrically by a connecting portion 521. As a consequence, formed is a current path for generating the resonance magnetic field, leading from the terminal electrode 530 to the terminal electrode 531 through the lead layer 510, the leading-side resonance coil layer 500, the connecting portion 521, the resonance coil layer 3430 and the lead layer 511.

The leading-side resonance coil layer 500 and the resonance coil layer 3430 can generate resonance magnetic field in the longitudinal direction not only in the trailing gap between the main magnetic pole layer 340 and the auxiliary magnetic pole layer 345 but also in the leading gap between the main magnetic pole layer 340 and the auxiliary shield layer 346 when electricity is supplied to this current path. The resonance magnetic field (the magnetic field for advance resonance) generated in this leading gap can exert the ferromagnetic resonance effect effectively by moving the magnetization of the record portion preliminarily because the advance resonance magnetic field is applied before the write magnetic field in the perpendicular direction rises up at the record portion of the rotating magnetic disk.

In the meantime, the leading-side write coil 50 can be formed of the same material as the write coil 343. The leading-side coil insulating layer 55 can be formed of the same material as the coil insulating layer 344. Further, the connecting portions 520, 521 may be formed of conductive material such as Cu or of the same material as the both layers of the main magnetic pole layer 340 and the auxiliary magnetic pole layer 345 at the same time when these layers are formed.

Figure 7:
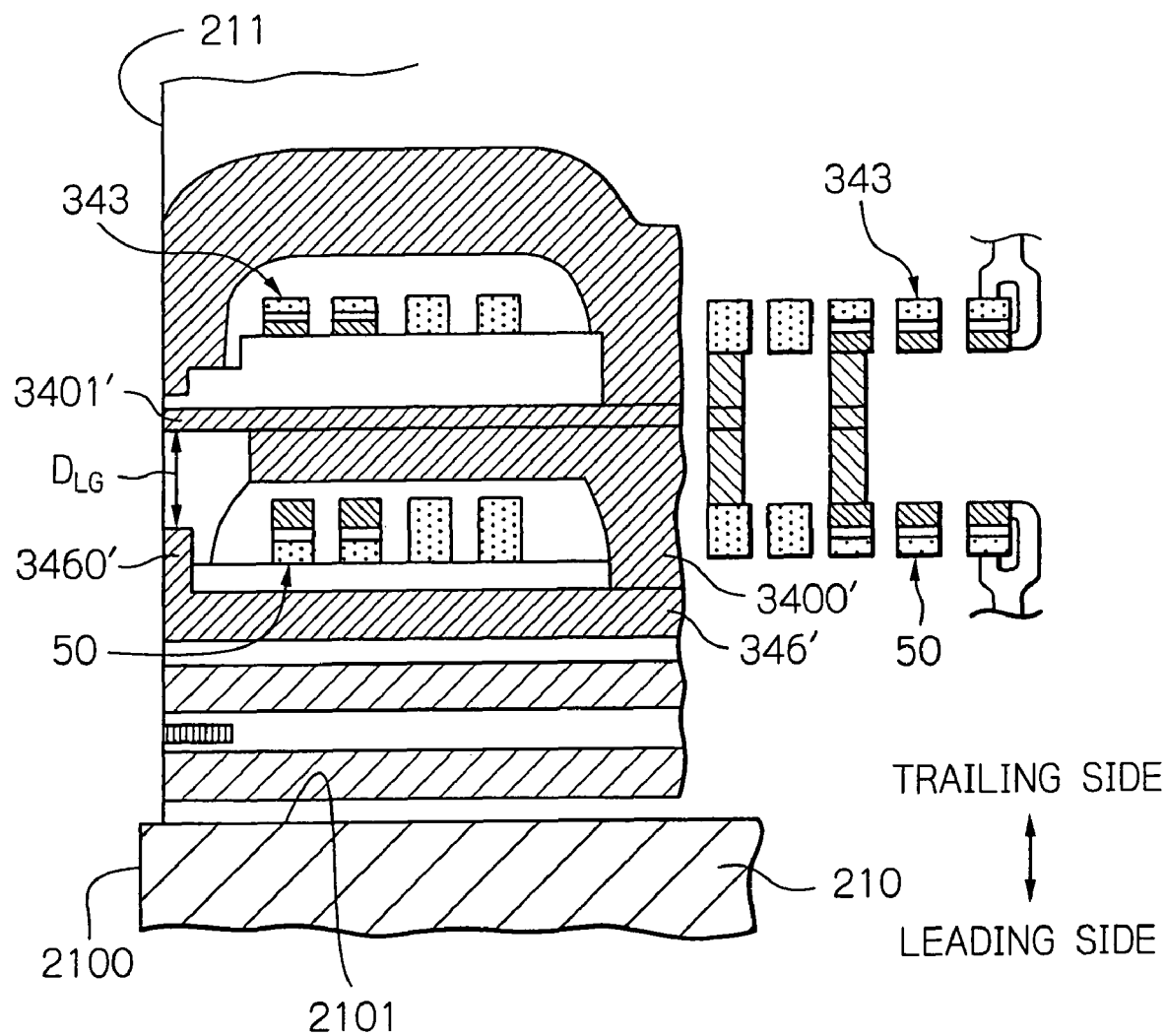
FIG. 7 shows a cross-sectional view taken along the line A-A illustrating a main portion of the fourth embodiment of the thin-film magnetic head according to the present invention.

FIG. 7 shows a cross-sectional view taken along the line A-A illustrating a main portion of the fourth embodiment of the thin-film magnetic head according to the present invention.

As shown in FIG. 7, this embodiment has the same structure as the third embodiment shown in FIG. 6 except that the auxiliary shield layer 346' and the main magnetic pole layer 340' are connected magnetically. Therefore, the description of other structure than the both layers will not be repeated.

According to this embodiment, as shown in FIG. 7, a portion separated from the end portion on the slider end surface 21 side of the main pole yoke layer 3400' possessed by the main magnetic pole layer 340' is connected to the auxiliary shield layer 346' magnetically. In this case, the shunt effect of magnetic flux possessed by the leading shield portion 3460' which is the end portion on the slider end surface 211 side of the auxiliary shield layer 346' is increased. As a consequence, the magnetic field gradient of the write magnetic field can be increased further even if the leading gap length $D_{LG}$ is not made so small, thereby further increasing the possibility of head design. Further, the intensity of the advance resonance magnetic field in the leading gap, generated in the resonance coil portion 54r which is a part of the write coil 343 and the leading-side write coil 50, can be intensified sufficiently.

Figure 8A:
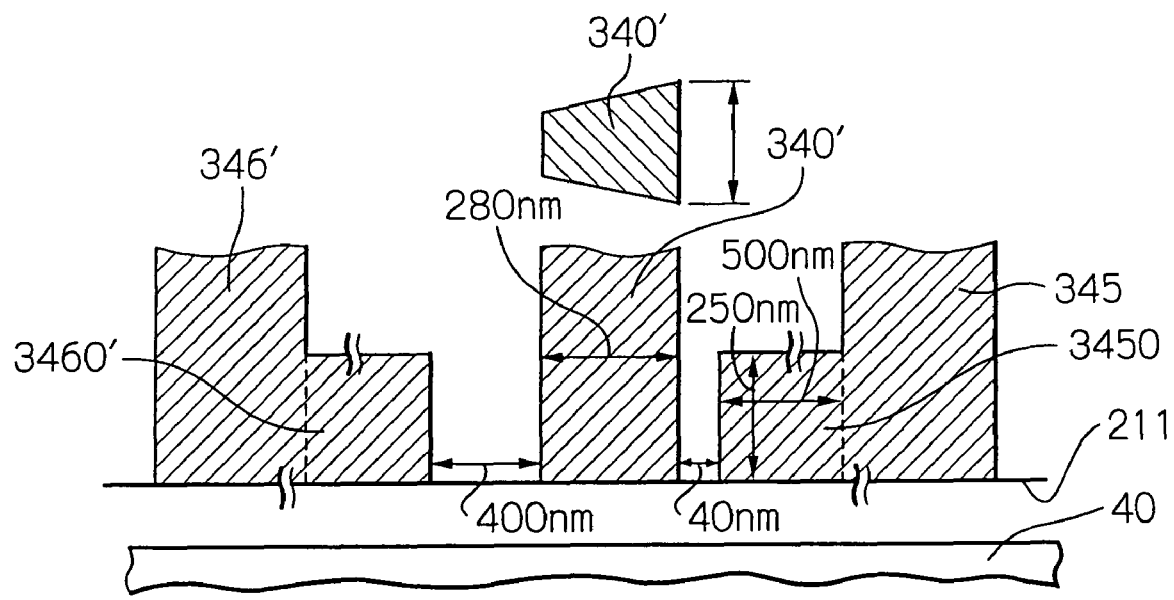
FIG. 8a shows a cross-sectional view illustrating a head model according to the fourth embodiment shown in FIG. 7.
Figure 8B:
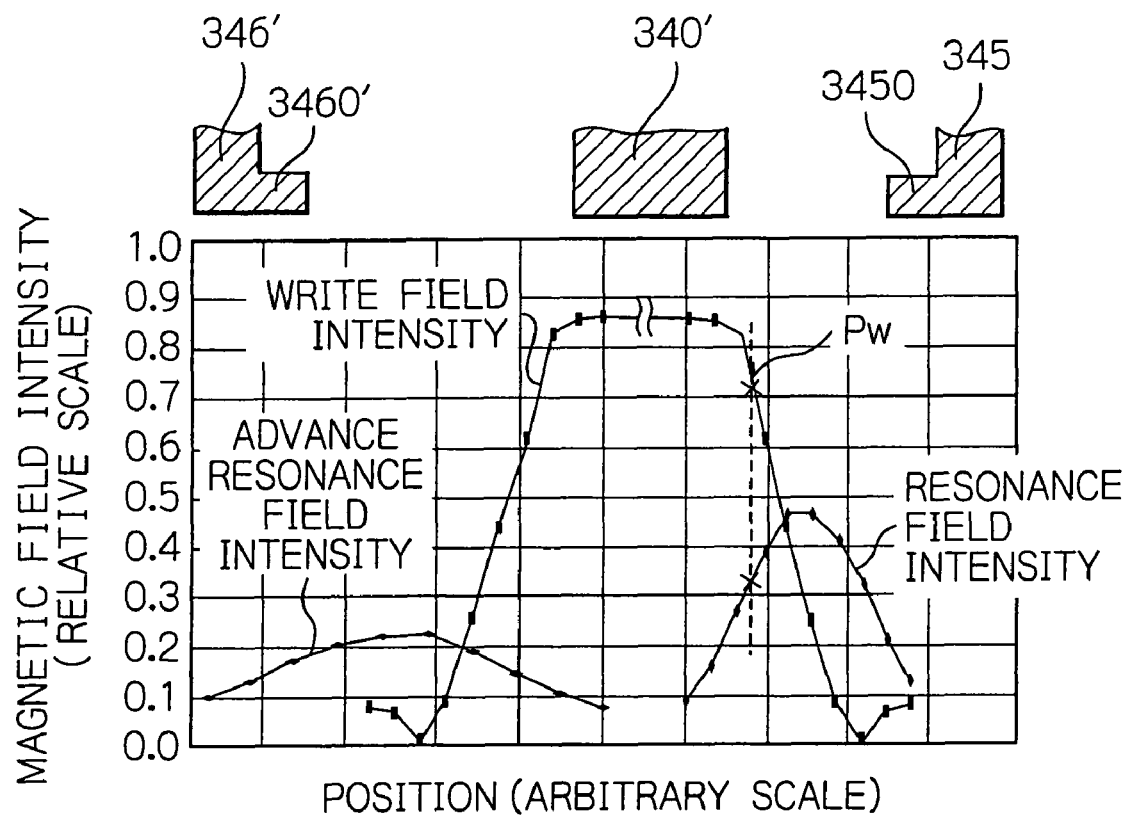
FIG. 8b shows a graph illustrating a simulation result of the distribution of write magnetic field and (advance) resonance magnetic field around the trailing gap and leading gap according to the fourth embodiment.

FIG. 8a shows a cross-sectional view illustrating a head model according to the fourth embodiment shown in FIG. 7, and FIG. 8b shows a graph illustrating a simulation result of the distribution of write magnetic field and (advance) resonance magnetic field around the trailing gap and leading gap according to the fourth embodiment.

As shown in FIG. 8a, the structure of the head model for use in the simulation is based on the fourth embodiment shown in FIG. 7. The length in the layer thickness direction (the thickness) of the end portion on the slider end surface 211 side of the main magnetic pole layer 340' was 280 nm and the width in the track width direction of the trailing end of the main magnetic pole layer 340' was 150 nm. The length in the layer thickness direction (the thickness) of a projecting portion of the trailing shield portion 3450 was 500 nm and the length in a perpendicular direction to the slide end face 211 (the height) of the trailing shield portion 3450 was 250 nm. Additionally, the trailing gap length $D_{TG}$ was 40 nm and the leading gap length $D_{LG}$ was 400 nm.

In the graph of the simulation analysis shown in FIG. 8b, its abscissa axis indicates a position X in the track direction (direction perpendicular to the track width direction on the slider end surface 211) of this head model so as to provide an arbitrary scale. The ordinate axis indicates relative values about the intensity of the write magnetic field in the perpendicular direction and the advance resonance magnetic field in the longitudinal direction, which are relative values of the maximum amplitude intensities at an intermediate position in the thickness direction within the magnetic recording layer 404.

As shown in FIG. 8b, the write magnetic field is distributed in a trapezoidal form around the position of the main magnetic pole layer 340' so that it rises up from within the range of the leading gap and attenuated within the range of the trailing gap. On the other hand, the advance resonance magnetic field is distributed in both leading gap area and trailing gap area and it reaches a maximum value just before the write magnetic field rises in the leading gap area, and then, it rises up again before the write magnetic field reaches a write operation point $P_W$ having a large magnetic field gradient in the trailing gap area. The intensity of the resonance magnetic field superimposed on the write magnetic field at the write operation point $P_W$ is a smaller value than this write magnetic field like the first embodiment shown in FIG. 4b. As a consequence, the reversal of magnetization or the demagnetization of the record portion can be carried out effectively without prolonging time required for the reversal of magnetization.

The advance resonance magnetic field generated in the leading gap reaches its maximum value just before the write magnetic field rises up. Thus, the record portion of the rotating magnetic disk receives this advance resonance magnetic field before it receives the write magnetic field in the perpendicular direction. Thus, the magnetization of the record portion is subjected to precession movement by the advance resonance magnetic field before reversed by the write magnetic field. Consequently, the ferromagnetic resonance effect can be exerted more effectively at an actual write operation point $P_W$.

Because the resonance magnetic field of the trailing gap is generated around the vicinity of the trailing end of the main magnetic pole layer 340 like the write magnetic field, the resonance magnetic field and the write magnetic field can be applied to the record portion of the magnetic recording layer securely at the same time. Consequently, the write accuracy and quality of data signal are improved.

Further according to the thin-film magnetic head, such magnetic recording method can be achieved without use of any special device that turns to a large burden, such as an electron discharge source and a laser beam source, thereby achieving downsizing and reduction of cost.

Figure 9A:
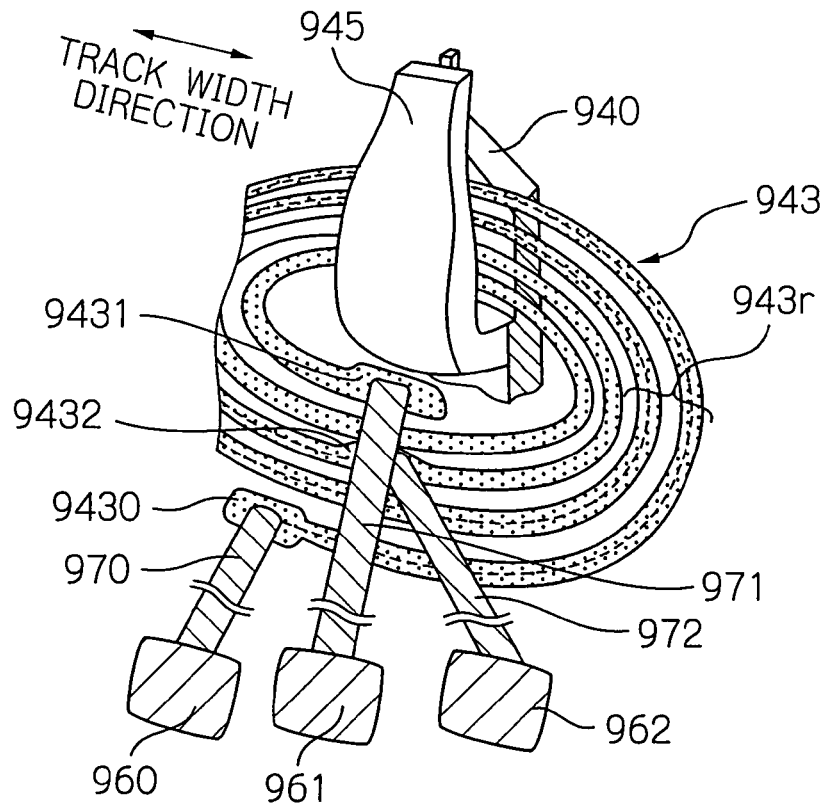
FIGS. 9a and 9b show a perspective view and a cross-sectional view taken along the line A-A of FIG. 2, illustrating a main portion of the thin-film magnetic head of the fifth embodiment according to the present invention.
Figure 9B:
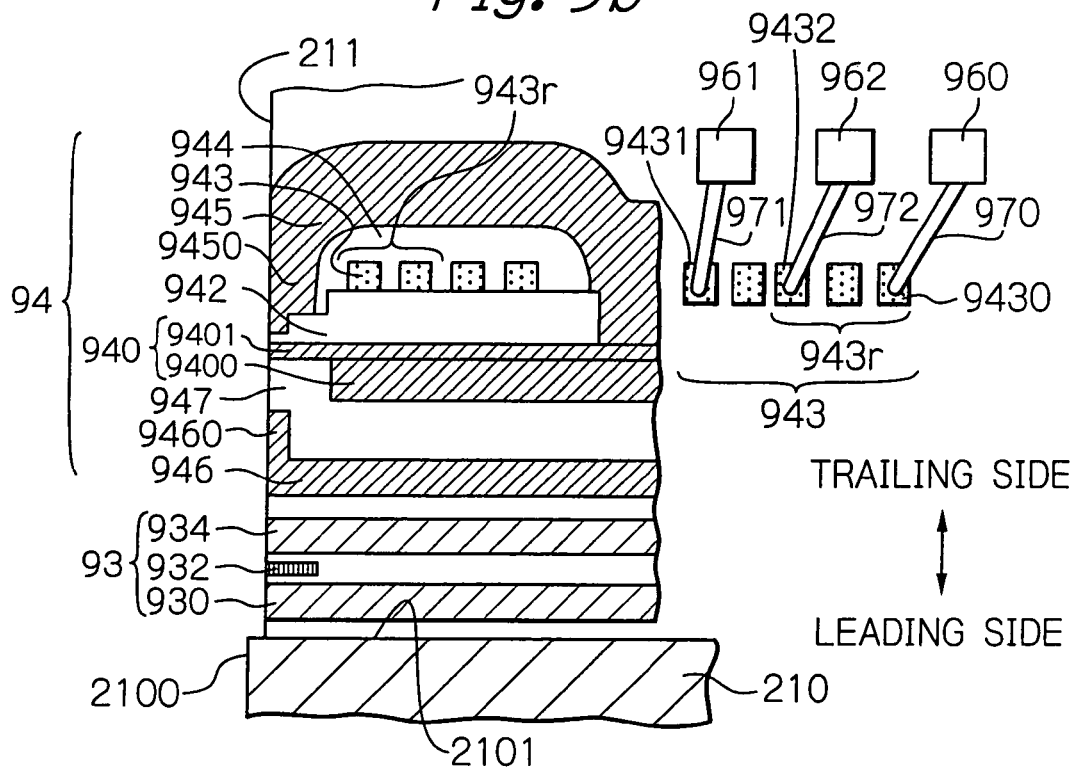

FIGS. 9a and 9b show a perspective view and a cross-sectional view taken along the line A-A of FIG. 2, illustrating a main portion of the thin-film magnetic head of the fifth embodiment according to the present invention.

Although a main magnetic pole layer 940 and an auxiliary magnetic pole layer 945 are equal to the first embodiment (FIGS. 2 and 3) in the fifth embodiment as shown in FIG. 9a, a write coil 943 and electric connection therearound are different. The write coil 943 has a spiral shape and is constructed in a single layer structure from the end portion on the outer peripheral side to the end portion of the inner peripheral side such that it passes through at least once between the main magnetic pole layer 940 and the auxiliary magnetic pole layer 945 in a single turn.

The write coil 943 generates magnetic flux corresponding to the write magnetic field in a magnetic circuit formed of the main magnetic pole layer 940 and the auxiliary magnetic pole layer 945 when electricity is supplied between the end portion 9431 on the inner peripheral side and the intermediate portion 9432 using terminal electrodes 961 and 962. Further, a part of the write coil 943 serves as a resonance coil portion 943r for generating resonance magnetic field which is a high frequency magnetic field in micro wave band having ferromagnetic resonance frequency of the magnetic recording layer in the magnetic disk or a frequency in the vicinity thereof.

In the resonance coil portion 943r, the end portion on the outer peripheral side thereof serves as the end portion 9430 on the outer peripheral side of the write coil 943, while the end portion on the inner peripheral side of the resonance coil portion 943r serves as an intermediate portion 9432 provided at the halfway of the write coil 943. Magnetic flux corresponding to the resonance magnetic field is generated in a magnetic circuit formed of the main magnetic pole layer 940 and the auxiliary magnetic pole layer 945 when electricity is supplied to the end portion 9430 and the intermediate portion 9432 by using the terminal electrodes 960 and 962. This resonance coil portion 943r serves as a portion containing current path on the outermost periphery (in this embodiment, containing the current path of outermost periphery and a second current path from the outermost periphery) of the write coil 943.

A tap lead layer 972 as a tap is connected electrically to the halfway of the write coil 943. The tap lead layer 972 connects the intermediate portion 9432 of the resonance coil portion 943r with the terminal electrode 962 electrically. That is, the resonance coil portion 943r is a portion between the tap lead layer 972 (the intermediate portion 9432) and the end portion 9430. Here, preferably, the tap lead layer 972 (the intermediate portion 9432) is grounded. In the meantime, the end portion 9430 and the terminal electrode 960 are connected electrically by the lead layer 970 and the end portion 9431 and the terminal electrode 961 are connected electrically by the lead layer 971.

By forming the resonance coil portion 943r as a part of the write coil 943, the quantity of turns of the resonance coil portion 943r is limited, so that the increase of effective inductance in the micro wave band can be more reduced. Further, the interference of drive current can be reduced largely compared with the case of providing the resonance coil portion independently of the write coil 943.

Both the write coil 943 and the resonance coil portion 943r can be brought close enough to the trailing gap because the resonance coil portion 943r contains current path on the outermost periphery of the write coil 943, thereby improving the generation efficiencies of the write magnetic field and the resonance magnetic field.

Next, as shown in FIG. 9b, in the fifth embodiment, the MR effect element 93 is the same as the MR effect element 33 of the first embodiment. The electromagnetic coil element 94 is for perpendicular magnetic recording like the first embodiment, and includes the main magnetic pole layer 940, the trailing gap layer 942, the write coil 943 containing the resonance coil portion 943r, the coil insulating layer 944, the auxiliary magnetic pole layer 945, the auxiliary shield layer 946 as an auxiliary shield and the leading gap layer 947.

The auxiliary magnetic pole layer 945 and the auxiliary shield layer 946 are disposed on the trailing side and the leading side of the main magnetic pole layer 940 respectively. In the auxiliary magnetic pole layer 945, a portion distant from the end portion on the ABS 2100 side (on the slider end surface 211 side) is magnetically connected to the main magnetic pole layer 940. On the other hand, the auxiliary shield layer 946 is not magnetically connected to the main magnetic pole layer 940, however, it may be connected thereto. The constituent material, shape and effect of the auxiliary magnetic pole layer 945 and the auxiliary shield layer 946 are the same as the auxiliary magnetic pole layer 345 and the auxiliary shield layer 346 of the first embodiment.

Optimization of the magnetic field gradient and the intensity of the write magnetic field by adjusting the shape of the end portion of the main magnetic pole layer 940 on the slider end surface 211, the effective recording width, the trailing gap length $D_{TG}$ and the leading gap length $D_{LG}$, is the same as the first embodiment explained in FIG. 3b.

As shown in FIG. 9b, the resonance coil portion 943r is a portion containing the current path on the outermost periphery of the write coil 943, which exists between the tap lead layer 972 (the intermediate portion 9432) and the end portion 9430. When resonance current is applied to this resonance coil portion 943r, resonance magnetic field in the longitudinal direction (in-plane direction or substantially in-plane direction of the magnetic disk surface and simultaneously track direction) is generated between the end portion of the main magnetic pole layer 940 and the trailing shield portion 9450. By applying the resonance magnetic field in the longitudinal direction to the magnetic recording layer during writing, the write magnetic field intensity in the vertical direction (the direction vertical or substantially vertical to the surface of the magnetic recording layer) required for writing can be reduced largely.

The coil insulating layer 944 is provided to electrically insulate the write coil 943 from the magnetic layer and the like around by surrounding the write coil 943. The write coil 943 containing the resonance coil portion 943r, the tap lead layer 972, and the lead layers 970, 971 are constituted of Cu film or the like with thickness of approximately 0.3 to 5 μm, formed according to frame plating method, sputtering method or the like. Further, the coil insulating layer 944 is constituted of photo resist cured by heating with thickness of approximately 0.5 to 7 μm, formed according to photo lithography.

Figure 10:
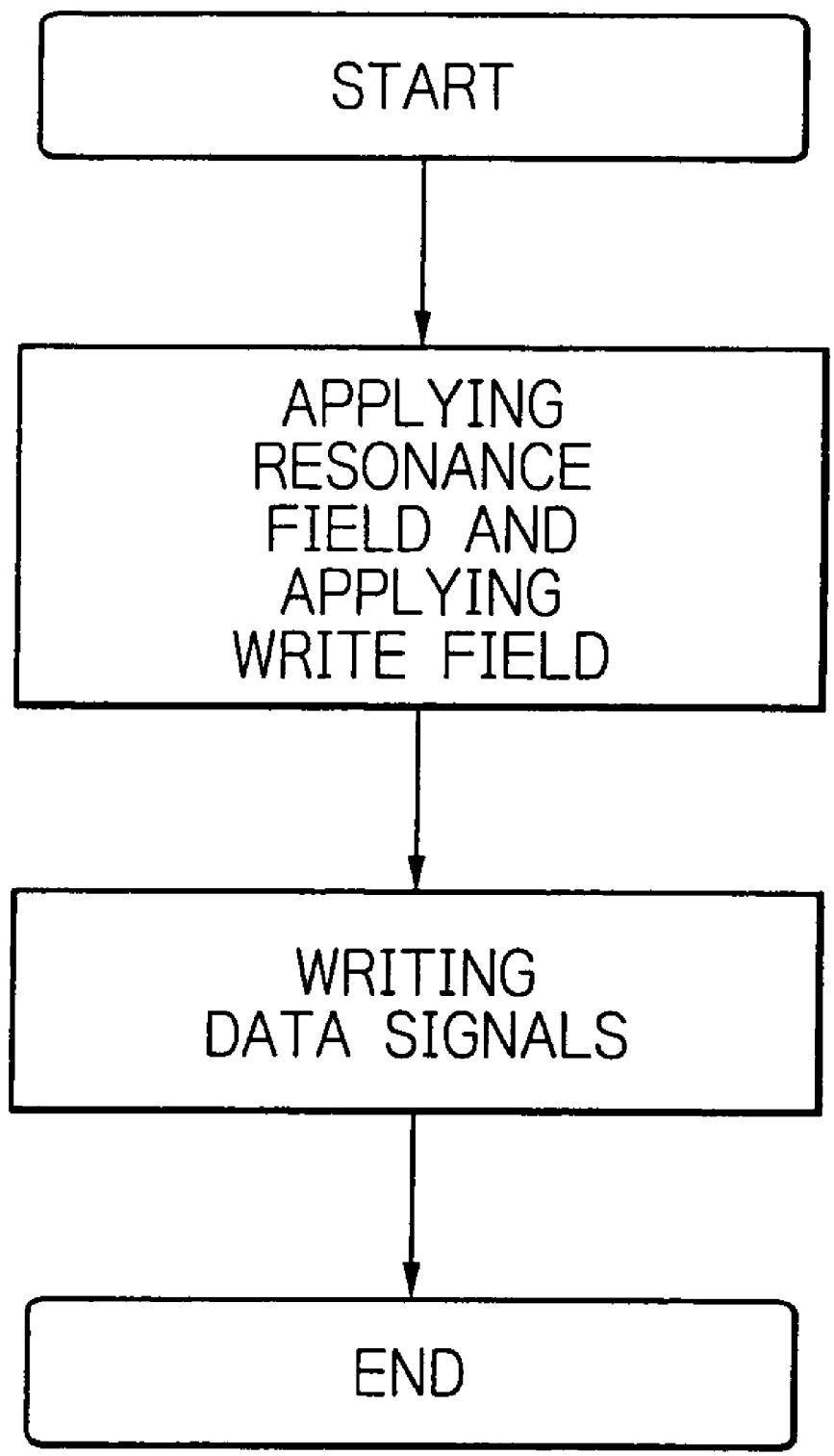
FIG. 10 shows a flowchart of an embodiment of the magnetic recording method according to the present invention, described with reference to FIG. 4b.

FIG. 10 shows a flowchart of an embodiment of the magnetic recording method according to the present invention, described with reference to FIG. 4b.

Referring to FIG. 10, first, resonance magnetic field is generated in the trailing gap area from the main magnetic pole layer 340 by applying resonance current having a frequency in the microwave band (approximately 1 to 15 GHz) to the resonance coil layer 3430. Then, write magnetic field is generated by supplying write current to the write coil portion 343a and the write coil layer 343b. Then, while this resonance magnetic field is applied in the longitudinal direction (in-plane or substantially in-plane direction of the surface of the magnetic recording layer and simultaneously track direction), this write magnetic field is applied in the perpendicular direction to the magnetic recording layer (the perpendicular or substantially perpendicular direction to the surface of the magnetic recording layer), thus, write operation of data signal is preformed.

Here, the processes from the application of the resonance magnetic field to write operation of data signal are carried out at the same time. While, in the embodiment of the magnetic recording method shown in FIG. 8b, the application of the advance resonance magnetic field is carried out preliminarily through the leading gap. In this way, it is also preferable that the application of the advance resonance magnetic field is carried out before the application of the resonance magnetic field and the write magnetic field.

Consequently, it is understood that, according to the above-described magnetic recording method, data signal can be written with high accuracy on the magnetic disk having high coercive force, without the heat assist (without heating).

Figure 11A:
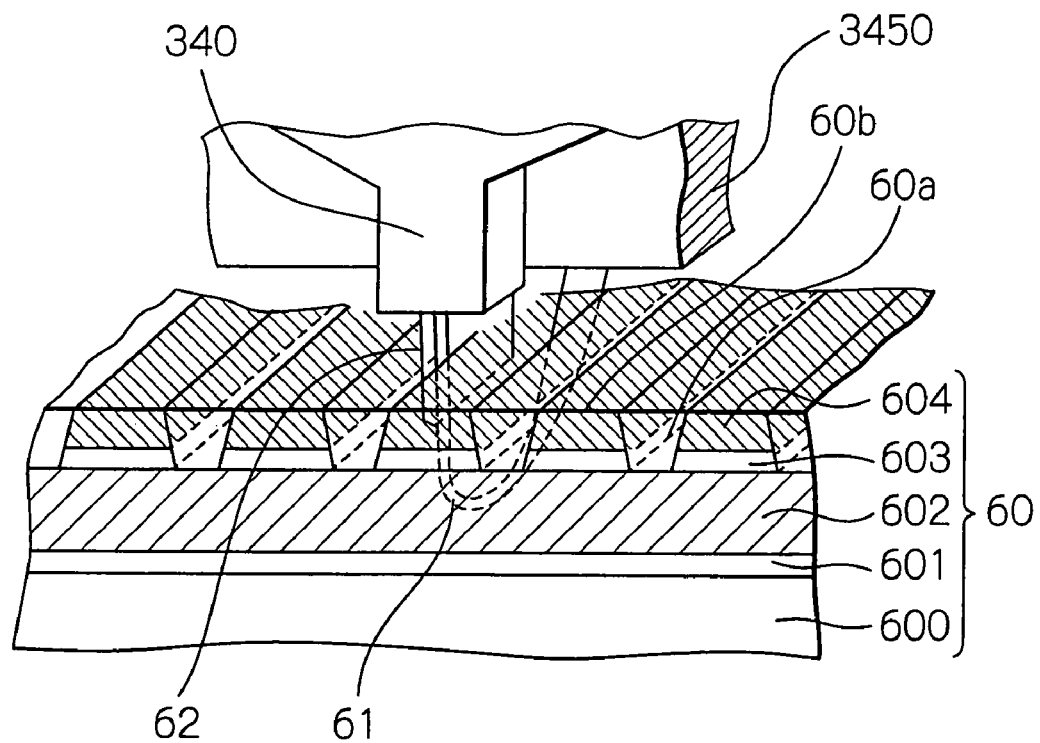
FIGS. 11a and 11b show perspective views schematically explaining embodiments using the discrete track medium and the patterned medium, respectively.
Figure 11B:
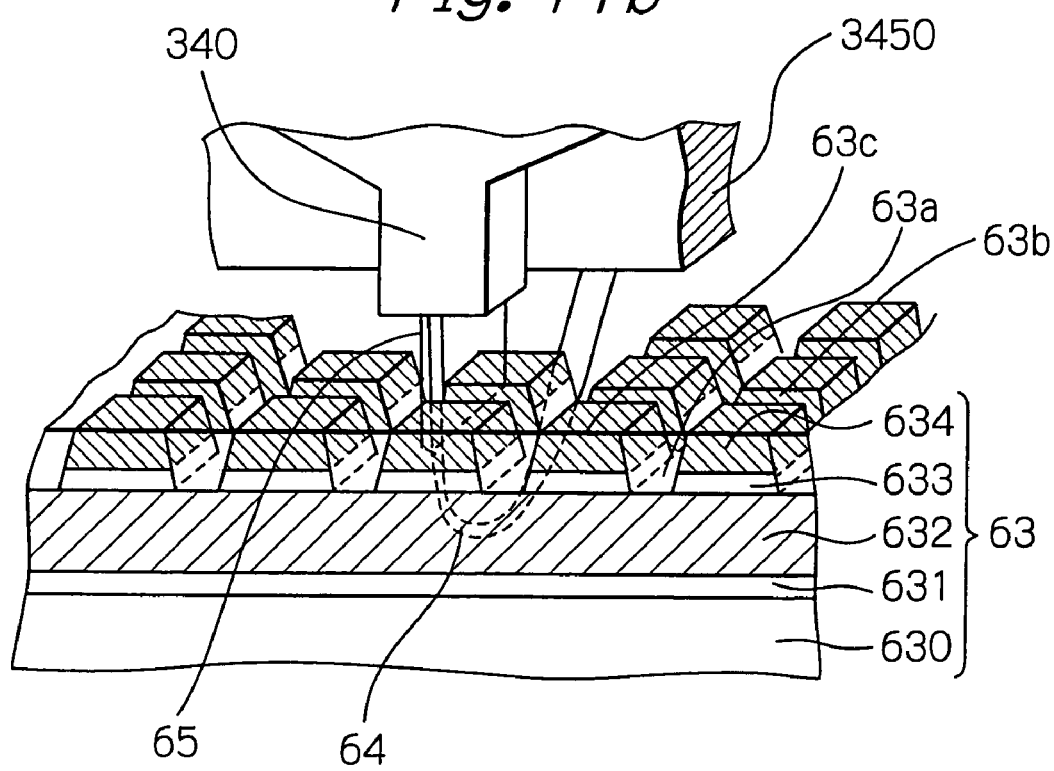

FIGS. 11a and 11b show perspective views schematically explaining embodiments using the discrete track medium and the patterned medium, respectively. Although the head of the first embodiment has been used in these figures, it is apparent that the same effect can be exerted even if other embodiments are used.

As shown in FIG. 11a, in a discrete track medium 60, a magnetic recording layer 604 and an intermediate layer 603 are divided by a non-magnetic separating layer 60a composed of non-magnetic material extended in the track length direction so as to form a plurality of discrete tracks 60b. That is, the discrete track medium 60 is one of magnetic disks intended to have higher track density.

Write magnetic field in the perpendicular direction corresponding to magnetic flux 61 and resonance magnetic field in the longitudinal direction corresponding to magnetic flux 62 are applied to the record portion in the discrete track 60b of the discrete track medium 60. Generally, the effective record width on the magnetic recording medium is determined depending on the width in the track width direction of the main magnetic pole layer 340. However, if the width of the discrete track 60 is set smaller than the width of this main magnetic pole layer 340, the effective record width can be reduced.

Because the ferromagnetic resonance frequency of the discrete track 60b also depends on the width of the discrete track 60b, increased is the possibility upon design of the frequency of the resonance magnetic field. Further, because adjacent tracks are separated magnetically, the ferromagnetic resonance can be induced only in the record portion, thereby preventing unnecessary write or erase operation to the adjacent tracks.

As shown in FIG. 11b, in a patterned medium 63, a magnetic recording layer 634 and an intermediate layer 633 are divided by a non-magnetic separating layer 63a composed of non-magnetic material extended in the track direction (longitudinal direction) so as to form a plurality of the discrete tracks. And further, each of the plurality of the discrete tracks is divided by a plurality of non-magnetic separating portions 63b so as to form a plurality of magnetic recording portions 63c. This plurality of the magnetic recording portions 63c are extremely minute magnetic material patterns, each corresponding to a record bit. The patterned medium 63 reduces interference of the signal magnetic field not only between the tracks but also between the record bits, having a possibility of achieving a higher recording density than the discrete track medium. As alternatives of the above-described patterned medium, used is a medium in which single-magnetic-domain structures arranged artificially in shape and size, for example, fine particles are disposed in the form of an array.

Magnetic field in the perpendicular direction corresponding to the magnetic flux 64 and resonance magnetic field in the longitudinal direction corresponding to the magnetic flux 65 are applied to the magnetic recording portion 63c of this patterned medium 63. In this case, because the effective record width and the record bit length are determined by the width and length of the magnetic recording portion 63c, a high recording density can be attained sufficiently even if the width and the trailing gap length of the main magnetic pole layer 340 are not reduced so much, by reducing the width and the length of the magnetic recording portion 63c sufficiently.

Further, because the ferromagnetic resonance frequency of the magnetic recording portion 63c depends on the width, length and thickness of the magnetic recording portion 63c, increased is the possibility upon design of the frequency of the resonance magnetic field. Further, although the resonance magnetic field with high frequency is distributed slightly wider in the track direction compared with the write magnetic field in the perpendicular direction because the resonance magnetic field is in the longitudinal direction, providing the magnetic recording portion 63c prevents unnecessary write or erase operation not only to adjacent tracks but also to the magnetic recording portions 63c adjacent in the track direction.

FIG. 12 shows a schematic diagram of a circuit comprising a current source, a transmitting portion, an impedance adjusting portion and a thin-film magnetic head, for explaining impedance matching in the magnetic recording/reproducing apparatus according to the present invention. Although the figure indicates a connection for impedance matching in the head of the first embodiment, it is apparent that the connection can be achieved for the impedance matching in the second, third and fourth embodiments by analogy with this.

Referring to FIG. 12, a write current source 180 having output impedance $Z_{d1}$ is connected to a coupling system of an impedance adjusting portion 14 having impedance $Z_{h1}$, the write coil portion 343a and the write coil layer 343b through transmission channels 130 and 134 each having characteristic impedance $Z_0$. A resonance current source 181 having output impedance $Z_{d2}$ is connected to a coupling system of the impedance adjusting portion 14 having impedance $Z_{h2}$ and the resonance coil layer 3430 through the transmission channels 130 and 132 each having characteristic impedance $Z_0$.

Matching of impedance in such a circuit is indispensable for suppressing the distortion of current waveform and the reflection loss in a wide band and for supplying appropriate currents effectively from a current source to a coil system. The design of impedance matching in a circuit comprising a current source, a transmitting portion and a coil is described in detail in, for example, "Writing at high data rates", by K. B. Klaassen and J. C. L. van Peppen, Journal of Applied Physics, May 2003, Vol, 93, No. 10, p. 6450 to 6452.

The condition for matching the impedance between current sources ($Z_{d1}$, $Z_{d2}$) and the transmitting portion ($Z_0$) is as follows according to the above-described document:

$$Z_{d1} = Z_{d2} = 2Z_0 \quad (1)$$

Therefore, by obtaining the matching between the output impedance of the write current source and sum of the characteristic impedances of the transmission channels, and further between the output impedance of the resonance current source and sum of the characteristic impedances of the transmission channels, necessary conditions for supplying appropriate currents effectively from the current source to the coil system can be satisfied.

The condition for matching the impedance between the transmitting portion and the adjusting-portion/coil-system ($Z_{h1}$, $Z_{h2}$) is as follows according to the above-described document:

$$2Z_0 = Z_{h1} = Z_{h2} \quad (2)$$

This condition will be described in detail below.

Figure 13A:
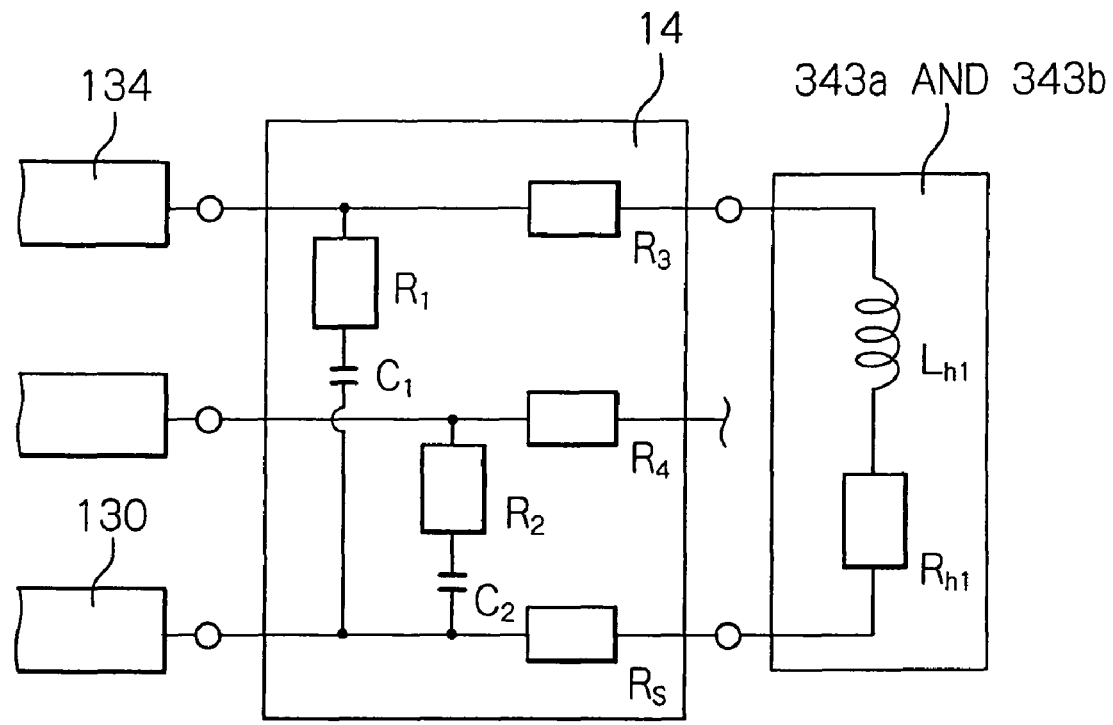
FIGS. 13a and 13b show schematic diagrams of a circuit including an impedance adjusting portion, a write coil portion and write coil layer, and a resonance coil layer, for explaining the impedance matching between the transmitting portion and the adjusting-portion/coil-system.
Figure 13B:
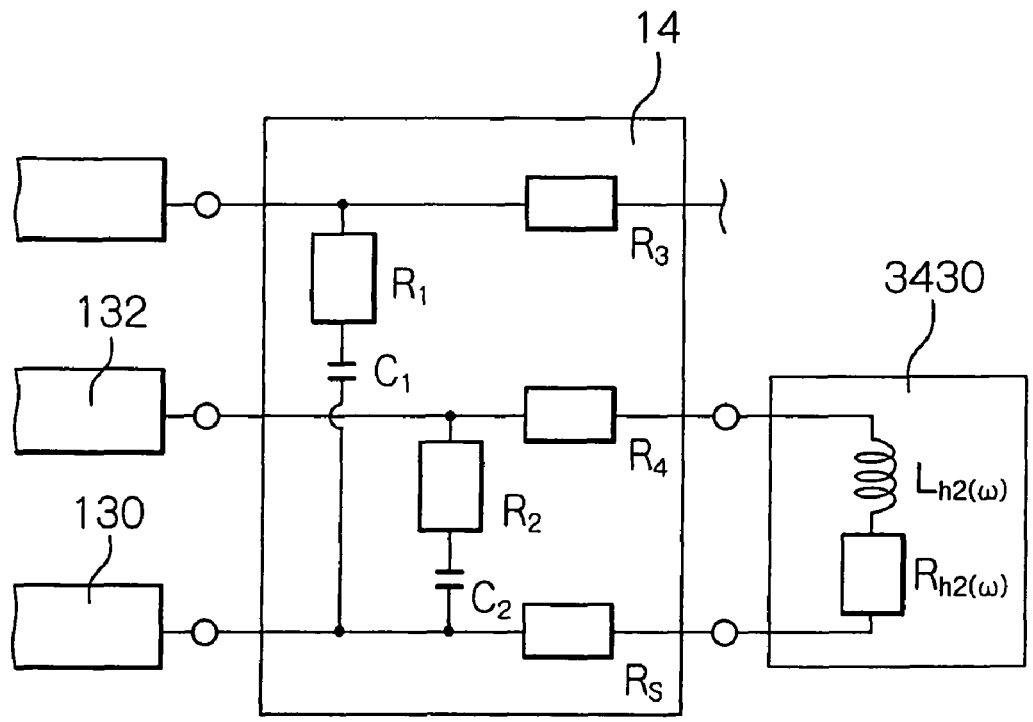

FIGS. 13a and 13b show schematic diagrams of a circuit including an impedance adjusting portion, a write coil portion and write coil layer, and a resonance coil layer, for explaining the impedance matching between the transmitting portion and the adjusting-portion/coil-system.

Referring to FIGS. 13a and 13b, the impedance adjusting portion 14 has a resistor $R_s$, and a resistor $R_3$ which is an adjustment resistor portion on respective two lines connecting the transmission channels 130 and 134 with the write coil portion 343a and the write coil layer 343b. Further, these two lines are connected with the series of a resistor $R_1$ which is a adjustment resistor portion and a capacitor (capacity) $C_1$ which is an adjustment capacitor portion. A resistor $R_s$, (one and the same as the above resistor $R_s$) and a resistor $R_4$ which is an adjustment resistor portion are provided on respective the two lines for connecting the transmission channels 130 and 132 with the resonance coil layer 3430. Further, these two lines are connected with the series of the resistor $R_2$ which is a adjustment resistor portion and a capacitor $C_2$ which is an adjustment capacitor portion.

The write coil portion 343a and the write coil layer 343b can be equivalent to an inductance $L_{h1}$ and a resistor $R_{h1}$ which are connected in series, and the resonance coil layer 3430 can be equivalent to an inductance $L_{h2}$ and a resistor $R_{h2}$ which are connected in series. Here, the resistors $R_{h1}$ and resistor $R_{h2}$ include resistance of wiring portions such as lead layers.

Referring to FIG. 13a, the condition for matching the impedance between the transmitting portions (transmission channels 130 and 134) and the write coil 343 is as follows according to the equation (2).

$$2Z_0 = R_1 = R_{h1} + R_s + R_3 = (L_{h1}/C_1)^{0.5} \quad (3)$$

Therefore, when the impedances of the transmitting portion ($Z_0$), and the write coil portion 343a and the write coil layer 343b ($L_{h1}$, $R_{h1}$) are a given condition, $R_1$, $R_3$ and $C_1$ may be adjusted to establish each equal sign in the equation (3) in order to match the impedance.

Next, referring to FIG. 13b, the condition for matching the impedance between the transmitting portion (transmission channels 130 and 132) and the resonance coil layer 3430 is as follows according to the equation (2).

$$2Z_0 = R_2 = R_{h2} + R_s + R_4 = (L_{h2}/C_2)^{0.5} \quad (4)$$

Therefore, when the impedances of the transmitting portion ($Z_0$) and the resonance coil 3430 ($L_{h2}$, $R_{h2}$) are a given condition, $R_2$, $R_4$ and $C_2$ may be adjusted to establish each equal sign in the equation (4) in order to match the impedance. Here, although $R_s$, may be adjusted, the matching is easier under the condition that this value is fixed because $R_s$, appears in both the equations (3) and (4).

The condition for impedance matching has been described above. In the impedance matching between the transmitting portion and the resonance coil layer 3430, the frequency dependency needs to be considered because the frequency of the resonance current turns to a value in the microwave range or over 1 GHz.

FIG. 14 shows a schematic diagram of a circuit including a current source, a transmitting portion, an impedance adjusting portion and a thin-film magnetic head, for explaining the impedance matching in the magnetic recording/reproducing apparatus of the fifth embodiment.

Referring to FIG. 14, the write current source 180 having the output impedance $Z_{d1}$ is connected to a coupling system of the impedance adjusting portion having the impedance $Z_{h1}$, and the write coil 343 other than the resonance coil portion 943r through the transmission channels 132 and 134 having the characteristic impedance $Z_0$. Further, the resonance current source having the output impedance $Z_{d2}$ is connected to a coupling system of the impedance adjusting portion 14 having the impedance $Z_{h2}$ and the resonance coil portion 943r through the transmission channels 130 and 132 having the characteristic impedance $Z_0$. The connect point of the middle output in the figure of three outputs of the impedance adjusting portion 14 with the resonance coil portion 943r and a portion of the write coil 343 other than the resonance coil portion 943r are grounded.

The impedance matching in such a circuit is the same as the first embodiment described with reference to FIGS. 12 and 13. That is, the condition for matching the impedance between the current source ($Z_{d1}$, $Z_{d2}$) and the transmitting portion ($Z_0$) is as follows:

$$Z_{d1}=Z_{d2}=2Z_0 \quad (5)$$

Therefore, by obtaining the matching between the output impedance of the write current source and the sum of the characteristic impedances of the transmission channels, and further between the output impedance of the resonance current source and the sum of the characteristic impedances of the transmission channels, necessary conditions for supplying appropriate currents effectively from the current source to the coil system can be satisfied.

The condition for matching the impedance between the transmitting portion and the adjusting-portion/coil-system ($Z_{h1}$, $Z_{h2}$) is as follows:

$$2Z_0=Z_{h1}=Z_{h2}$$

Figure 15A:
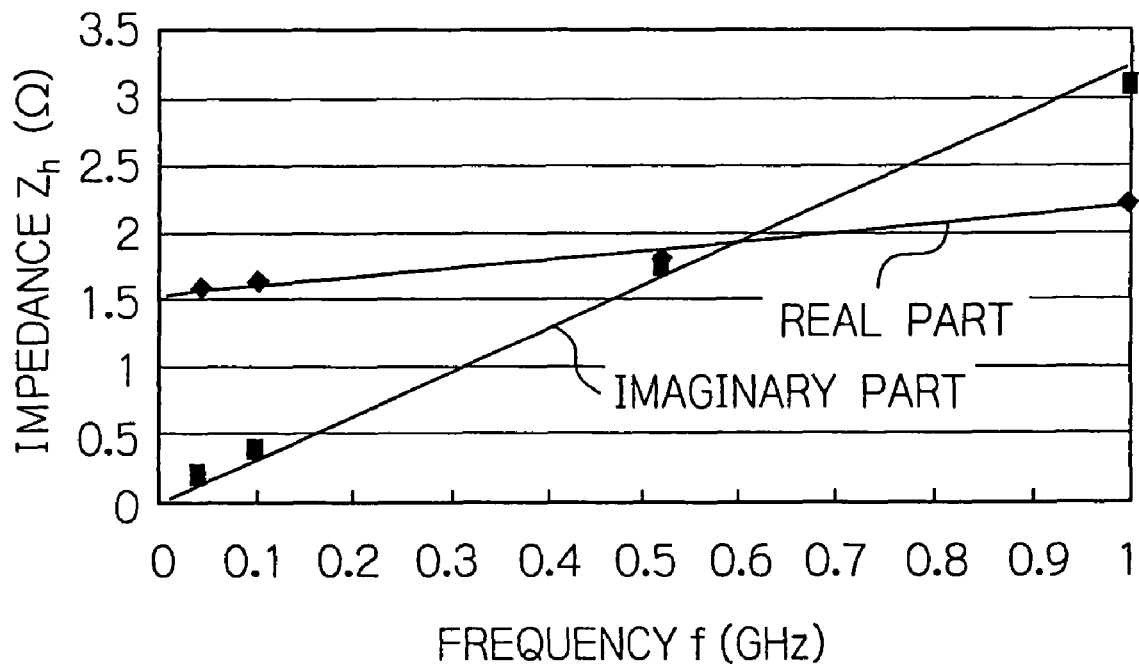
FIGS. 15a and 15b show graphs illustrating the measurement results of the frequency dependency of the impedance $Z_h$ in the write coil of the actually manufactured thin-film magnetic head according to the present invention.
Figure 15B:
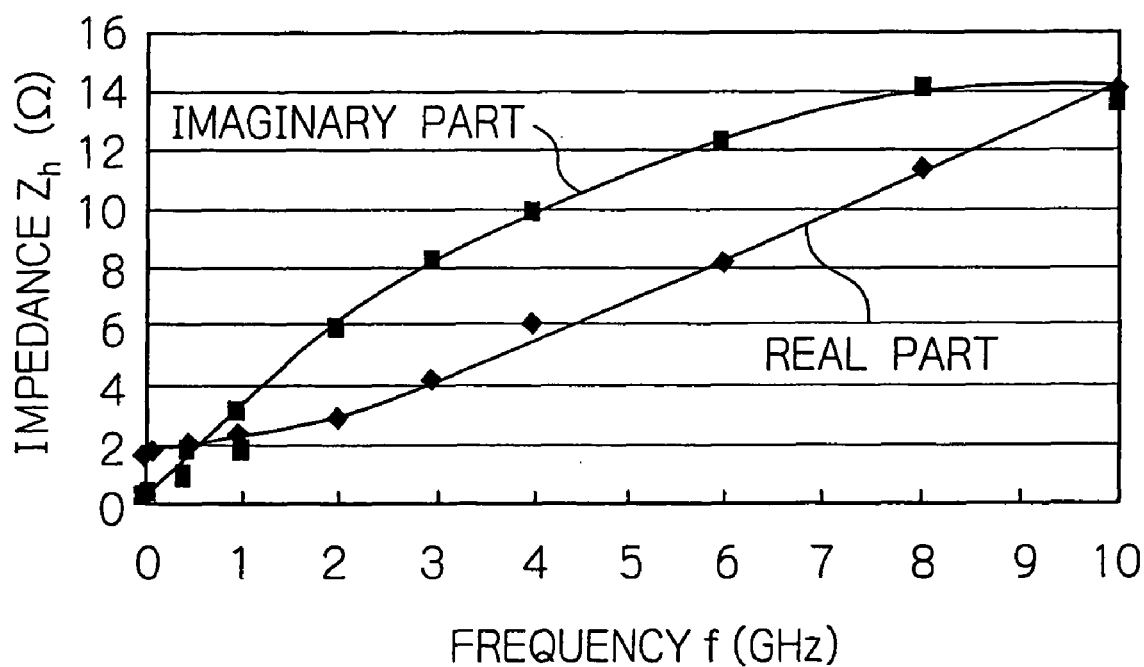

FIGS. 15a and 15b show graphs illustrating the measurement results of the frequency dependency of the impedance $Z_h$ in the write coil of the actually manufactured thin-film magnetic head according to the present invention. The thin-film magnetic head manufactured and measured was of the first embodiment.

In the measurement of the frequency dependency, transmission parameter S11 of the write coil was measured with a vector network analyzer for wide band, and an impedance value of each frequency was extracted.

FIG. 15a is the measurement result in the frequency band of 0 to 1 GHz. In the Figure, the real part of the impedance $Z_h$ is almost constant while the imaginary part increases proportionally to frequency f. Therefore, it is understood that the equivalent resistance and inductance of the head are almost of constant value.

On the other hand, FIG. 15b is the measurement result in the frequency band of 0 to 10 GHz. In the high frequency area of the microwave region over 2 GHz, the real part of the impedance $Z_h$ increases with the frequency. In an area of over 3 GHz, the imaginary part collapses in its linearity, indicating a tendency of saturation. As a consequence, it is understood that the equivalent resistance and impedance of the head cannot be regarded as constant value in the high frequency area of 2-3 GHz or more. Thus, this indicates that effective impedance values corresponding to the operating frequency needs to be used in the impedance matching.

In conclusion, impedance matching conditions between the transmitting portion (transmission channels 130 and 132) and the resonance coil layer 3430 is as follows, instead of the equation (4):

$$2Z_0=R_2=R_{h2}(\omega_r)+R_s+R_4=(L_{h2}(\omega_r)/C_2)^{0.5} \quad (7)$$

Here, $R_{h2}(\omega_r)$ is an effective resistance of the resonance coil portion in the ferromagnetic resonance frequency, and $L_{h2}(\omega_r)$ is an effective inductance of the resonance coil portion in the ferromagnetic resonance frequency. Here, the angular frequency $\omega_r$ is $\omega_r=2\pi f_r$ when the ferromagnetic resonance frequency is $f_r$.

By matching the impedance based on the equations (1), (3) and (7), the distortion of current waveform and the reflection loss in a wide band including the ferromagnetic resonance frequency are suppressed, so that appropriate currents can be supplied effectively from the current source to the coil system.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising an electromagnetic coil element comprising:
   a main magnetic pole formed on an element formation surface of a substrate having an opposed-to-medium surface, a write magnetic field generated from an end portion on the opposed-to-medium surface side of said main magnetic pole during write operation of data signals;
   an auxiliary magnetic pole, a portion distant from an end portion on the opposed-to-medium surface side of said auxiliary magnetic pole magnetically connected to said main magnetic pole; and
   a write coil formed so as to pass through at least between said main magnetic pole and said auxiliary magnetic pole, for generating the write magnetic field,
   a part of said write coil having a layered structure of: a resonance coil layer for generating a resonance magnetic field having ferromagnetic resonance frequency of a magnetic recording layer of a magnetic recording medium or having a frequency in the vicinity thereof; and a write coil layer, said resonance coil layer and said write coil layer sandwiching an insulating layer therebetween.

2. The thin-film-magnetic head as claimed in claim 1, wherein said resonance coil layer extends to an outermost periphery of said write coil.

3. The thin-film magnetic head as claimed in claim 1, wherein a tap is provided in an end portion of said resonance coil layer and in an intermediate portion of said write coil.

4. The thin-film magnetic head as claimed in claim 1, wherein said auxiliary magnetic pole is positioned on the trailing side of said main magnetic pole, and an auxiliary shield is provided on the leading side of said main magnetic pole.

5. The thin-film magnetic head as claimed in claim 4, wherein a portion distant from an end portion on the opposed-to-medium surface side of said auxiliary shield is magnetically connected to said main magnetic pole.

6. The thin-film magnetic head as claimed in claim 4, wherein a leading-side write coil is provided, which is formed so as to pass through at least between said main magnetic pole and said auxiliary shield, connected electrically in series with said write coil, and wound in an opposite direction to said write coil.

7. The thin-film magnetic head as claimed in claim 6, wherein a part of said leading-side write coil has a layered structure of a write coil layer and a leading-side resonance coil layer which sandwich an insulating layer therebetween, and wherein an end portion of said resonance coil layer which is an intermediate portion of said write coil and an end portion of said leading-side resonance coil layer which is an intermediate portion of said leading-side write coil are electrically connected to a connecting portion.

8. A thin-film magnetic head comprising an electromagnetic coil element comprising:
   a main magnetic pole formed on an element formation surface of a substrate having an opposed-to-medium surface, a write magnetic field generated from an end portion on the opposed-to-medium surface side of said main magnetic pole during write operation of data signals;

an auxiliary magnetic pole, a portion distant from an end portion on the opposed-to-medium surface side of said auxiliary magnetic pole magnetically connected to said main magnetic pole; and a write coil formed so as to pass through at least between said main magnetic pole and said auxiliary magnetic pole, for generating the write magnetic field, a part of said write coil serving as a resonance coil portion for generating a resonance magnetic field having ferromagnetic resonance frequency of a magnetic recording layer of a magnetic recording medium or having a frequency in the vicinity thereof.

9. The thin-film magnetic head as claimed in claim 8, wherein said resonance coil portion serves as a portion including a current path on the outermost periphery of said write coil.

10. The thin-film magnetic head as claimed in claim 8, wherein a tap is provided in an intermediate portion of said write coil, and said resonance coil portion serves as a portion between said tap and an end on the outer periphery side of said write coil.

11. The thin-film magnetic head as claimed in claim 8, wherein said auxiliary magnetic pole is positioned on the trailing side of said main magnetic pole, and an auxiliary shield is provided on the leading side of said main magnetic pole.

12. The thin-film magnetic head as claimed in claim 8, wherein the write magnetic field has a direction perpendicular or substantially perpendicular to a surface of the magnetic recording layer of a magnetic recording medium in a position of the magnetic recording layer, and the resonance magnetic field has a direction in-plane or substantially in-plane of the surface of the magnetic recording layer.

13. The thin-film magnetic head as claimed in claim 12, wherein the maximum value of the resonance magnetic field is set to be smaller than the maximum value of the write magnetic field in a position of the magnetic recording layer of the magnetic recording medium.

14. A head gimbal assembly comprising a thin-film magnetic head and a supporting mechanism for supporting said thin-film magnetic head, said thin-film magnetic head comprising an electromagnetic coil element comprising:

a main magnetic pole formed on an element formation surface of a substrate having an opposed-to-medium surface, a write magnetic field generated from an end portion on the opposed-to-medium surface side of said main magnetic pole during write operation of data signals;

an auxiliary magnetic pole, a portion distant from an end portion on the opposed-to-medium surface side of said auxiliary magnetic pole magnetically connected to said main magnetic pole; and a write coil formed so as to pass through at least between said main magnetic pole and said auxiliary magnetic pole, for generating the write magnetic field, a part of said write coil having a layered structure of: a resonance coil layer for generating a resonance magnetic field having ferromagnetic resonance frequency of a magnetic recording layer of a magnetic recording medium or having a frequency in the vicinity thereof; and a write coil layer, said resonance coil layer and said write coil layer sandwiching an insulating layer therebetween, and said head gimbal assembly further comprising a transmitting portion having a plurality of transmission channels, for transmitting a write current to be applied to said write coil and a resonance current to be applied to said resonance coil layer.

15. The head gimbal assembly as claimed in claim 14, wherein said resonance coil layer extends to an outermost periphery of said write coil.

16. The head gimbal assembly as claimed in claim 14, wherein a tap is provided in an end portion of said resonance coil layer and in an intermediate portion of said write coil.

17. The head gimbal assembly as claimed in claim 14, wherein said auxiliary magnetic pole is positioned on the trailing side of said main magnetic pole, and an auxiliary shield is provided on the leading side of said main magnetic pole.

18. The head gimbal assembly as claimed in claim 17, wherein a portion distant from an end portion on the opposed-to-medium surface side of said auxiliary shield is magnetically connected to said main magnetic pole.

19. The head gimbal assembly as claimed in claim 17, wherein a leading-side write coil is provided, which is formed so as to pass through at least between said main magnetic pole and said auxiliary shield, connected electrically in series with said write coil, and wound in an opposite direction to said write coil.

20. The head gimbal assembly as claimed in claim 19, wherein a part of said leading-side write coil has a layered structure of a write coil layer and a leading-side resonance coil layer which sandwich an insulating layer therebetween, wherein an end portion of said resonance coil layer which is an intermediate portion of said write coil and an end portion of said leading-side resonance coil layer which is an intermediate portion of said leading-side write coil are electrically connected to a connecting portion, and wherein said transmitting portion further serves for transmitting a resonance current to be applied to said leading-side resonance coil layer.

21. The head gimbal assembly as claimed in claim 14, wherein an impedance adjusting means is provided between said thin-film magnetic head and said transmitting portion, for matching an impedance of said thin-film magnetic head and an impedance of said plurality of transmission channels.

22. The head gimbal assembly as claimed in claim 21, wherein said impedance adjusting means has at least one adjustment resistor portion and at least one adjustment capacitor portion.

23. A head gimbal assembly comprising a thin-film magnetic head and a supporting mechanism for supporting said thin-film magnetic head, said thin-film magnetic head comprising an electromagnetic coil element comprising:

a main magnetic pole formed on an element formation surface of a substrate having an opposed-to-medium surface, a write magnetic field generated from an end portion on the opposed-to-medium surface side of said main magnetic pole during write operation of data signals;

an auxiliary magnetic pole, a portion distant from an end portion on the opposed-to-medium surface side of said auxiliary magnetic pole magnetically connected to said main magnetic pole; and a write coil formed so as to pass through at least between said main magnetic pole and said auxiliary magnetic pole, for generating the write magnetic field, a part of said write coil serving as a resonance coil portion for generating a resonance magnetic field having ferromagnetic resonance frequency of a magnetic recording layer of a magnetic recording medium or having a frequency in the vicinity thereof, and said head gimbal assembly further comprising a transmitting portion having a plurality of transmission channels, for transmitting a write current to be applied to said write coil and a resonance current to be applied to said resonance coil portion.

24. The head gimbal assembly as claimed in claim 23, wherein said resonance coil portion serves as a portion including a current path on the outermost periphery of said write coil.

25. The head gimbal assembly as claimed in claim 23, wherein a tap is provided in an intermediate portion of said write coil, and said resonance coil portion serves as a portion between said tap and an end on the outer periphery side of said write coil.

26. The head gimbal assembly as claimed in claim 23, wherein said auxiliary magnetic pole is positioned on the trailing side of said main magnetic pole, and an auxiliary shield is provided on the leading side of said main magnetic pole.

27. The head gimbal assembly as claimed in claim 23, wherein the write magnetic field has a direction perpendicular or substantially perpendicular to a surface of the magnetic recording layer of a magnetic recording medium in a position of the magnetic recording layer, and the resonance magnetic field has a direction in-plane or substantially in-plane of the surface of the magnetic recording layer.

28. The head gimbal assembly as claimed in claim 27, wherein the maximum value of the resonance magnetic field is set to be smaller than the maximum value of the write magnetic field in a position of the magnetic recording layer of the magnetic recording medium.

29. The head gimbal assembly as claimed in claim 23, wherein an impedance adjusting means is provided between said thin-film magnetic head and said transmitting portion, for matching an impedance of said thin-film magnetic head and an impedance of said plurality of transmission channels.

30. The head gimbal assembly as claimed in claim 29, wherein said impedance adjusting means has at least one adjustment resistor portion and at least one adjustment capacitor portion.

31. A magnetic recording/reproducing apparatus comprising at least one head gimbal assembly comprising a thin-film magnetic head and a supporting mechanism for supporting said thin-film magnetic head,
said thin-film magnetic head comprising an electromagnetic coil element comprising:
a main magnetic pole formed on an element formation surface of a substrate having an opposed-to-medium surface, a write magnetic field generated from an end portion on the opposed-to-medium surface side of said main magnetic pole during write operation of data signals;
an auxiliary magnetic pole, a portion distant from an end portion on the opposed-to-medium surface side of said auxiliary magnetic pole magnetically connected to said main magnetic pole; and
a write coil formed so as to pass through at least between said main magnetic pole and said auxiliary magnetic pole, for generating the write magnetic field,
a part of said write coil having a layered structure of: a resonance coil layer for generating a resonance magnetic field having ferromagnetic resonance frequency of a magnetic recording layer of a magnetic recording medium or having a frequency in the vicinity thereof; and a write coil layer, said resonance coil layer and said write coil layer sandwiching an insulating layer therebetween,
said head gimbal assembly further comprising a transmitting portion having a plurality of transmission channels, for transmitting a write current to be applied to said write coil and a resonance current to be applied to said resonance coil layer, and
said magnetic recording/reproducing apparatus further comprising:
at least one magnetic recording medium to which said thin-film magnetic head performs read and write operations;
a write current source connected to at least two of said plurality of transmission channels, for supplying the write current to said write coil; and
a resonance current source connected to at least two of said plurality of transmission channels, for supplying the resonance current for generating the resonance magnetic field in said resonance coil layer.

32. The magnetic recording/reproducing apparatus as claimed in claim 31, wherein obtained is matching between an output impedance of said resonance current source and a sum of characteristic impedances of at least two of said plurality of transmission channels connected to said resonance current source.

33. The magnetic recording/reproducing apparatus as claimed in claim 31, wherein obtained is matching between an output impedance of said write current source and a sum of characteristic impedances of at least two of said plurality of transmission channels connected to said write current source.

34. The magnetic recording/reproducing apparatus as claimed in claim 31, wherein said at least one magnetic recording medium has a magnetic recording layer and a soft-magnetic backing layer provided on the medium substrate side of said magnetic recording layer.

35. The magnetic recording/reproducing apparatus as claimed in claim 31, wherein said at least one magnetic recording medium is a discrete track medium or a patterned medium.

36. A magnetic recording/reproducing apparatus comprising at least one head gimbal assembly comprising a thin-film magnetic head and a supporting mechanism for supporting said thin-film magnetic head,
said thin-film magnetic head comprising an electromagnetic coil element comprising:
a main magnetic pole formed on an element formation surface of a substrate having an opposed-to-medium surface, a write magnetic field generated from an end portion on the opposed-to-medium surface side of said main magnetic pole during write operation of data signals;
an auxiliary magnetic pole, a portion distant from an end portion on the opposed-to-medium surface side of said auxiliary magnetic pole magnetically connected to said main magnetic pole; and
a write coil formed so as to pass through at least between said main magnetic pole and said auxiliary magnetic pole, for generating the write magnetic field,
a part of said write coil serving as a resonance coil portion for generating a resonance magnetic field having ferromagnetic resonance frequency of a magnetic recording layer of a magnetic recording medium or having a frequency in the vicinity thereof,
said head gimbal assembly further comprising a transmitting portion having a plurality of transmission channels, for transmitting a write current to be applied to said write coil and a resonance current to be applied to said resonance coil portion, and said magnetic recording/reproducing apparatus further comprising:
  at least one magnetic recording medium to which said thin-film magnetic head performs read and write operations;
  a write current source connected to at least two of said plurality of transmission channels, for supplying the write current to said write coil; and
  a resonance current source connected to at least two of said plurality of transmission channels, for supplying the resonance current for generating the resonance magnetic field in said resonance coil portion.

37. The magnetic recording/reproducing apparatus as claimed in claim 36, wherein obtained is matching between an output impedance of said resonance current source and a sum of characteristic impedances of at least two of said plurality of transmission channels connected to said resonance current source.

38. The magnetic recording/reproducing apparatus as claimed in claim 36, wherein obtained is matching between an output impedance of said write current source and a sum of characteristic impedances of at least two of said plurality of transmission channels connected to said write current source.

39. The magnetic recording/reproducing apparatus as claimed in claim 36, wherein said at least one magnetic recording medium has a magnetic recording layer and a soft-magnetic backing layer provided on the medium substrate side of said magnetic recording layer.

40. The magnetic recording/reproducing apparatus as claimed in claim 36, wherein said at least one magnetic recording medium is a discrete track medium or a patterned medium.

41. A magnetic recording method comprising steps of:
  generating a resonance magnetic field having a ferromagnetic resonance frequency of a magnetic recording layer of a magnetic recording medium or having a frequency in the vicinity thereof, by applying a current having a frequency in microwave band to a part of a write coil;
  generating a write magnetic field by applying a write current to said write coil while applying said resonance magnetic field to said magnetic recording layer; and
  performing a write operation by applying said write magnetic field to said magnetic recording layer.

42. The magnetic recording method as claimed in claim 41, wherein said write coil comprises a portion having a structure in which said resonance coil layer and said write coil layer are stacked so that said resonance coil layer and said write coil layer sandwich an insulating layer, and said resonance coil layer is used as said part of said write coil.

43. The magnetic recording method as claimed in claim 41, wherein a portion including a current path on the outermost periphery of said write coil is used as said part of said write coil.

44. The magnetic recording method as claimed in claim 41, wherein said resonance magnetic field is applied in a direction in-plane or substantially in-plane of a surface of said magnetic recording layer, and said write magnetic field is applied in a direction perpendicular or substantially perpendicular to the surface of said magnetic recording layer.

45. The magnetic recording method as claimed in claim 41, wherein the maximum value of said resonance magnetic field is set to be smaller than the maximum value of said write magnetic field in a position of said magnetic recording layer of said magnetic recording medium.

46. The magnetic recording method as claimed in claim 41, wherein an advance resonance magnetic field having a ferromagnetic resonance frequency of said magnetic recording layer or a frequency in the vicinity thereof is applied to said magnetic recording layer preliminarily, before said write operation is performed by applying said write magnetic field to said magnetic recording layer while applying said resonance magnetic field.

* * * * *